INVENTORS.
Morris E. Adams
Wilbur C. Crim
BY
C.R. Meland
Their Attorney

Aug. 4, 1964     M. E. ADAMS ETAL     3,142,890
ARMATURE WINDER AND STAKER
Filed Sept. 15, 1959     25 Sheets-Sheet 2

INVENTORS.
Morris E. Adams
Wilbur C. Crim
BY
C. R. Meland
Their Attorney

Aug. 4, 1964   M. E. ADAMS ETAL   3,142,890
ARMATURE WINDER AND STAKER
Filed Sept. 15, 1959   25 Sheets-Sheet 3

INVENTORS.
Morris E. Adams
Wilbur C. Crim

BY C. R. Meland
Their Attorney

Aug. 4, 1964    M. E. ADAMS ETAL    3,142,890
ARMATURE WINDER AND STAKER
Filed Sept. 15, 1959    25 Sheets-Sheet 5

INVENTORS.
Morris E. Adams
Wilbur C. Crim
BY
C. R. Meland
Their Attorney

INVENTORS.
Morris E. Adams
Wilbur C. Crim

C. R. Meland
Their Attorney

INVENTORS.
Morris E. Adams
Wilbur C. Crim

BY C. R. Meland

Their Attorney

INVENTORS.
Morris E. Adams
Wilbur C. Crim
BY
C. R. Meland
Their Attorney

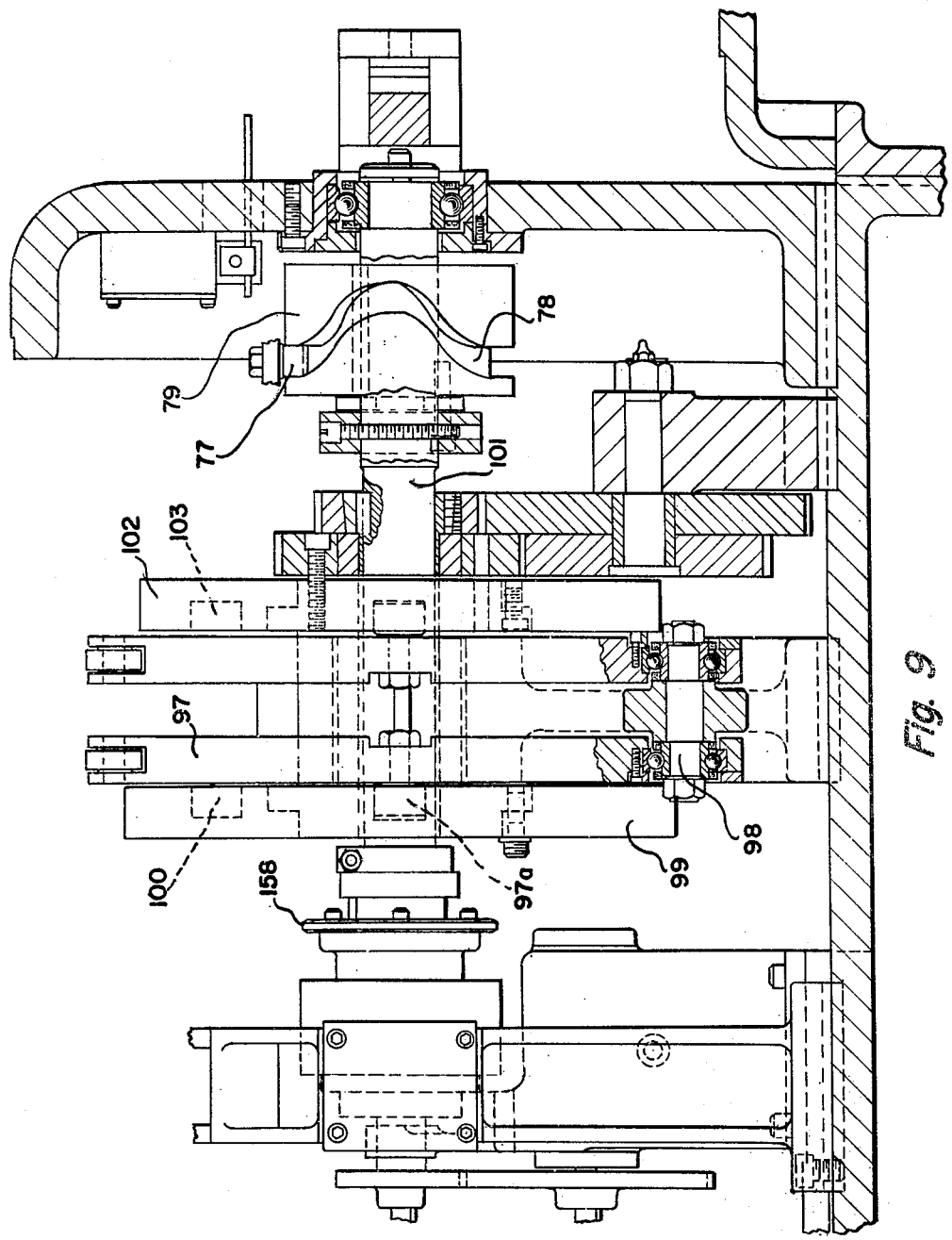

Aug. 4, 1964   M. E. ADAMS ETAL   3,142,890
ARMATURE WINDER AND STAKER
Filed Sept. 15, 1959   25 Sheets-Sheet 11

INVENTORS.
Morris E. Adams
Wilbur C. Crim
BY
C. R. Meland
Their Attorney

INVENTORS.
Morris E. Adams
Wilbur C. Crim
BY
C. R. Meland
Their Attorney

INVENTORS.
Morris E. Adams
Wilbur C. Crim

BY C. R. Meland

Their Attorney

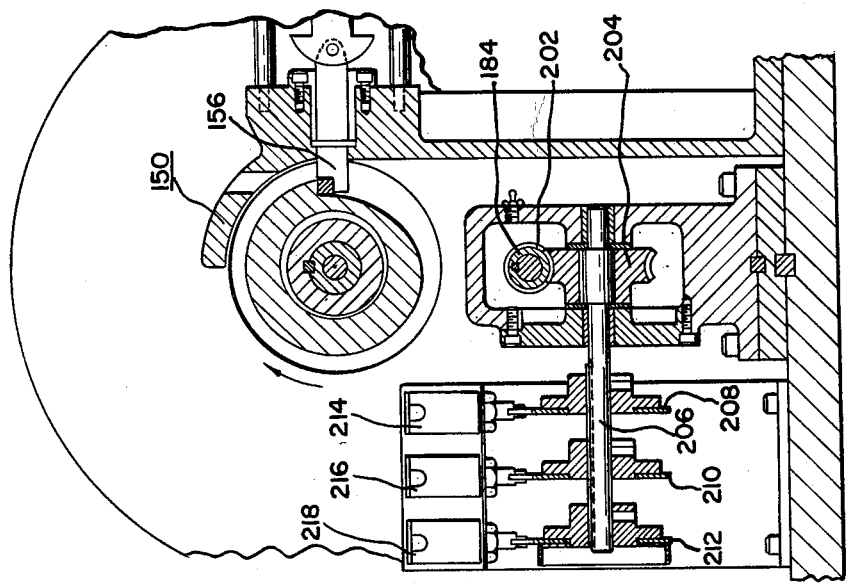
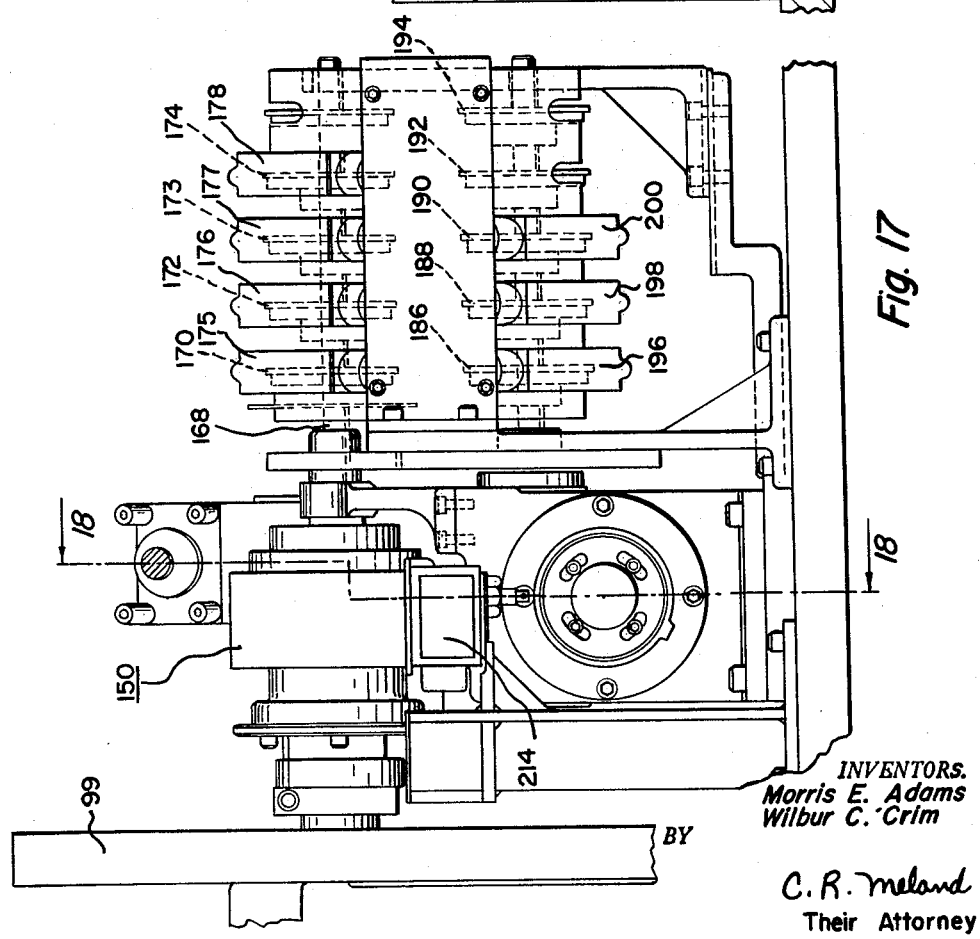

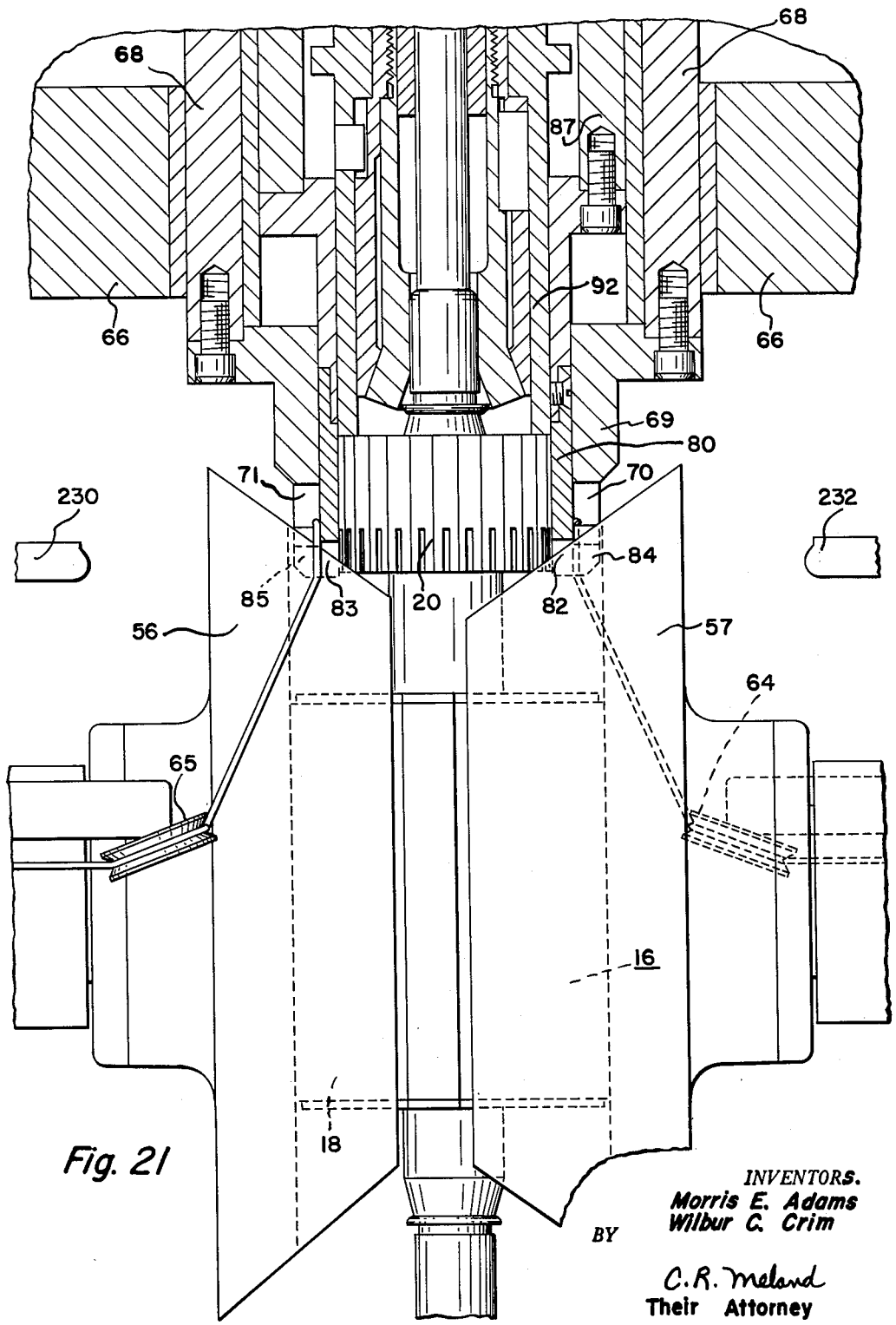

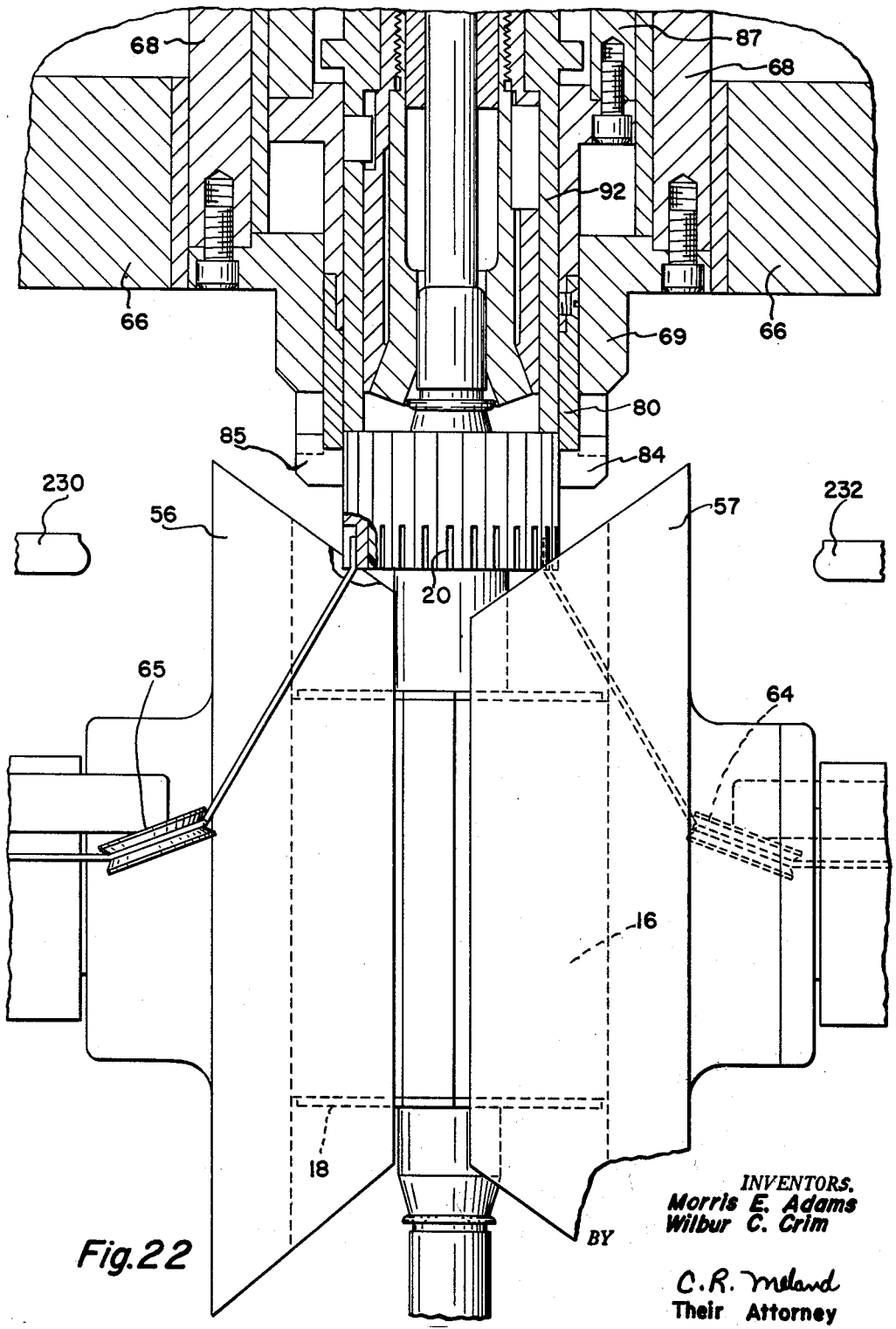

Aug. 4, 1964  M. E. ADAMS ETAL  3,142,890
ARMATURE WINDER AND STAKER
Filed Sept. 15, 1959  25 Sheets-Sheet 21

INVENTORS.
Morris E. Adams
Wilbur C. Crim
BY
C. R. Meland
Their Attorney

INVENTORS.
Morris E. Adams
Wilbur C. Crim
BY
C.R. Meland
Their Attorney

United States Patent Office 3,142,890
Patented Aug. 4, 1964

3,142,890
ARMATURE WINDER AND STAKER
Morris E. Adams and Wilbur C. Crim, Anderson, Ind., assignors to General Motors Corporation, Detroit, Mich., a corporation of Delaware
Filed Sept. 15, 1959, Ser. No. 840,193
23 Claims. (Cl. 29—155.5)

This invention relates to a method and apparatus for winding armatures and staking lead wires to a commutator in a continuous operation.

In past armature fabricating methods and apparatus it has been common practice to apply conductors to an armature core and then sever the conductors to form a plurality of severed conductor ends which are subsequently connected to commutator slots of a commutator. The winding operation and the connecting of the conductors to the commutator has been performed in two distinct and separate operations. This has necessitated employing separate machines for the winding and connecting and the transfer of the armature core from one machine to the other. This method has serious disadvantages in that the conductors must be held in some sort of orderly fashion during the transfer from the winding machine to the connecting machine and the method is slow as compared to the method and apparatus of this invention.

It is, accordingly, an object of this invention to provide a continuous method and apparatus for winding an armature and staking the conductors to a commutator.

Another object of this invention is to provide a method of winding an armature and staking lead wires to the commutator, the steps including, applying turns of wire to radially spaced slots of the armature core while maintaining the core stationary, passing the wire over a horn at the end of the last turn applied to the armature, gripping the wire between the horn and a gripping sleeve member, and then substantially simultaneously severing the wire at two points and driving the severed ends into commutator slots.

Still another object of this invention is to provide a machine for winding turns of wire on an armature core and staking the wires to a commutator, the machine including a pair of flyer arms which move in a circular path in a plane substantially parallel to the longitudinal axis of the armature core for applying wires to the armature core, and wherein the machine has a looping horn that is projected into the path of the wire carried by the flyer arms, the flyer arms carrying the wire around the looping horn to form a loop of wire having portions located in substantial alignment with slots of the commutator, there being a gripping sleeve provided which moves over the looping horn to grip the wire between the horn and the sleeve, the machine having a movable staker for severing the wire and driving it from between the horn and sleeve into a commutator slot.

Still another object of this invention is to provide a machine for winding armature cores and staking lead wires to a commutator, the staking devices having a variable throw and wherein the machine includes selective means for varying the throw of the staking devices whereby wires may be staked in a commutator slot at varying depths under selective control of the machine.

A further object of this invention is to provide an armature winding machine wherein the number of turns applied to a pair of armature core slots may be varied by simply changing the cams of a cam controller that forms a part of the machine.

Further objects and advantages of the present invention will be apparent from the following description, reference being had to the accompanying drawing wherein preferred embodiments of the invention are clearly shown.

In the drawings:

FIGURE 8b is a top view of the looping horn and gripping sleeve illustrated in FIGURE 8a.

FIGURE 9 is a sectional view taken along line 9—9 of FIGURE 8.

FIGURE 17 is a view of another cam controller which forms a part of the armature winder and staker of this invention.

FIGURE 18 is a sectional view taken along line 18—18 of FIGURE 17.

FIGURES 21 through 23 are views illustrating various positions of the looping horn and gripping sleeve during the winding and staking operation.

Figure 1:
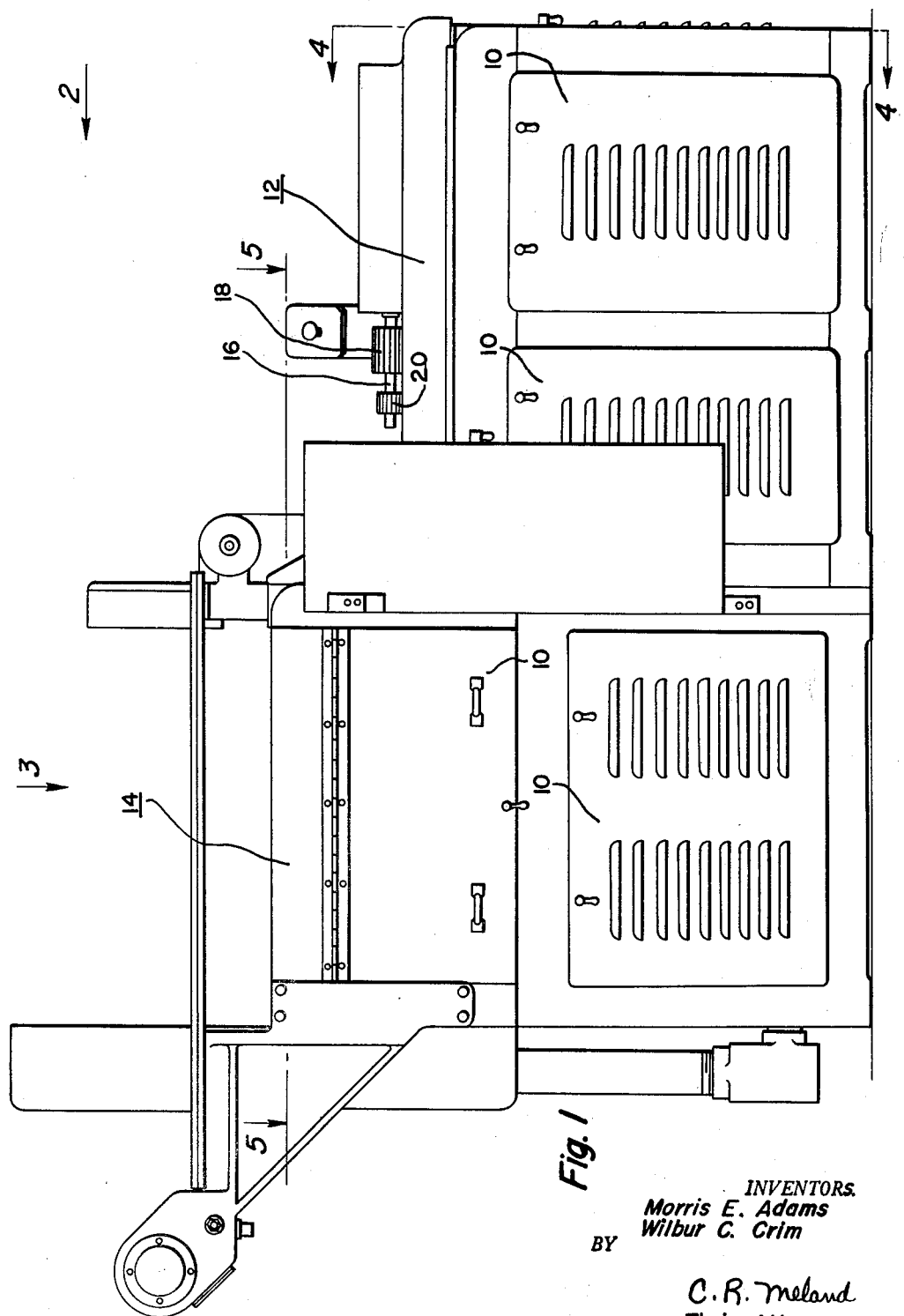
FIGURE 1 is a side view of an armature winder and staker made in accordance with this invention.
Figure 2:
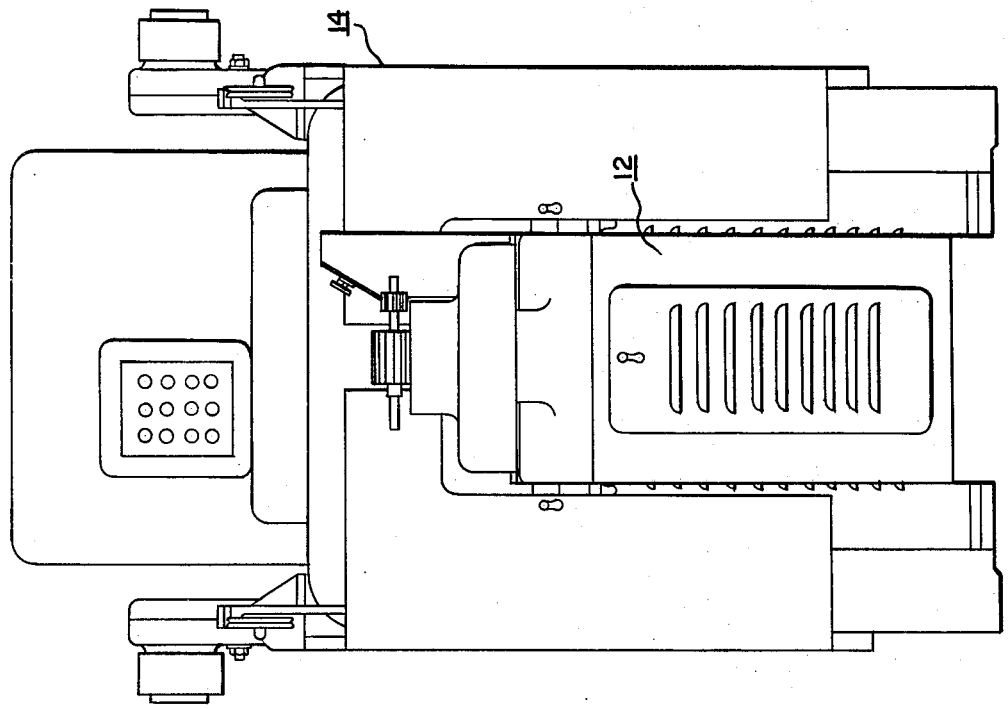
FIGURE 2 is an end view of the armature winder and staker illustrated in FIGURE 1 and showing an armature assembly prior to its insertion into the armature winder and staker.
Figure 3:
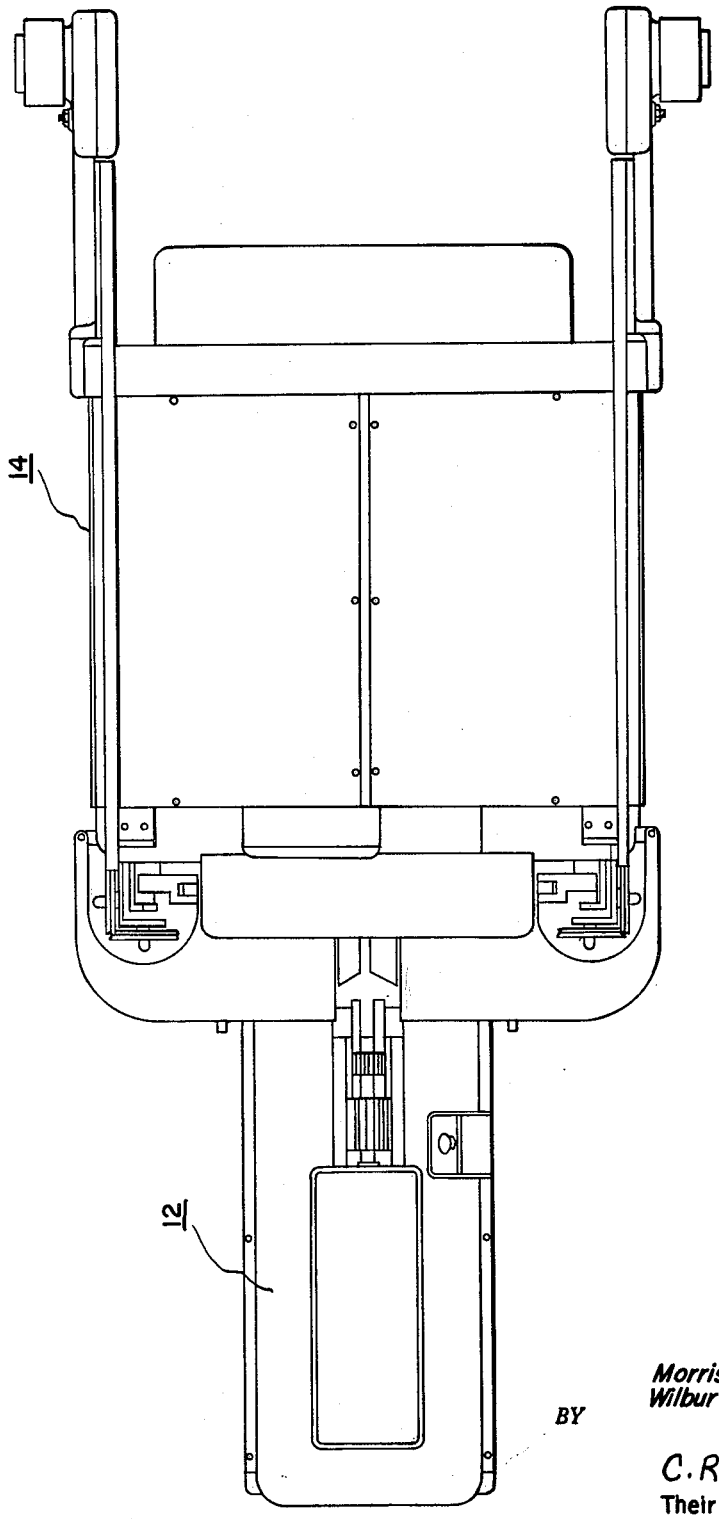
FIGURE 3 is a top view of the armature winder and staker illustrated in FIGURE 1.

Referring now to the drawings and more particularly to FIGURES 1, 2 and 3, it is seen that the armature winder and staker of this invention has a main frame to which are attached the access panels 10. For better understanding of this invention the armature winder and staker has a front end section generally designated by reference numeral 12 and a rear section generally designated by reference numeral 14. An armature assembly designated by reference numeral 16 having an unwound armature core 18 and a commutator 20 is illustrated in FIGURE 1 in a position ready to be chucked in place for the winding and staking operation. The operator of the machine stands adjacent the front section 12 when operating the machine and places the assembly 16 in the position illustrated in FIGURE 1 when it is desired to wind the wires on the core and stake the lead wires to the commutator 20. It is seen from FIGURE 2 that the front section 12 is narrower in width than the rear section 14 and this is also clearly apparent from the top view illustrated in FIGURE 3.

Figure 4:
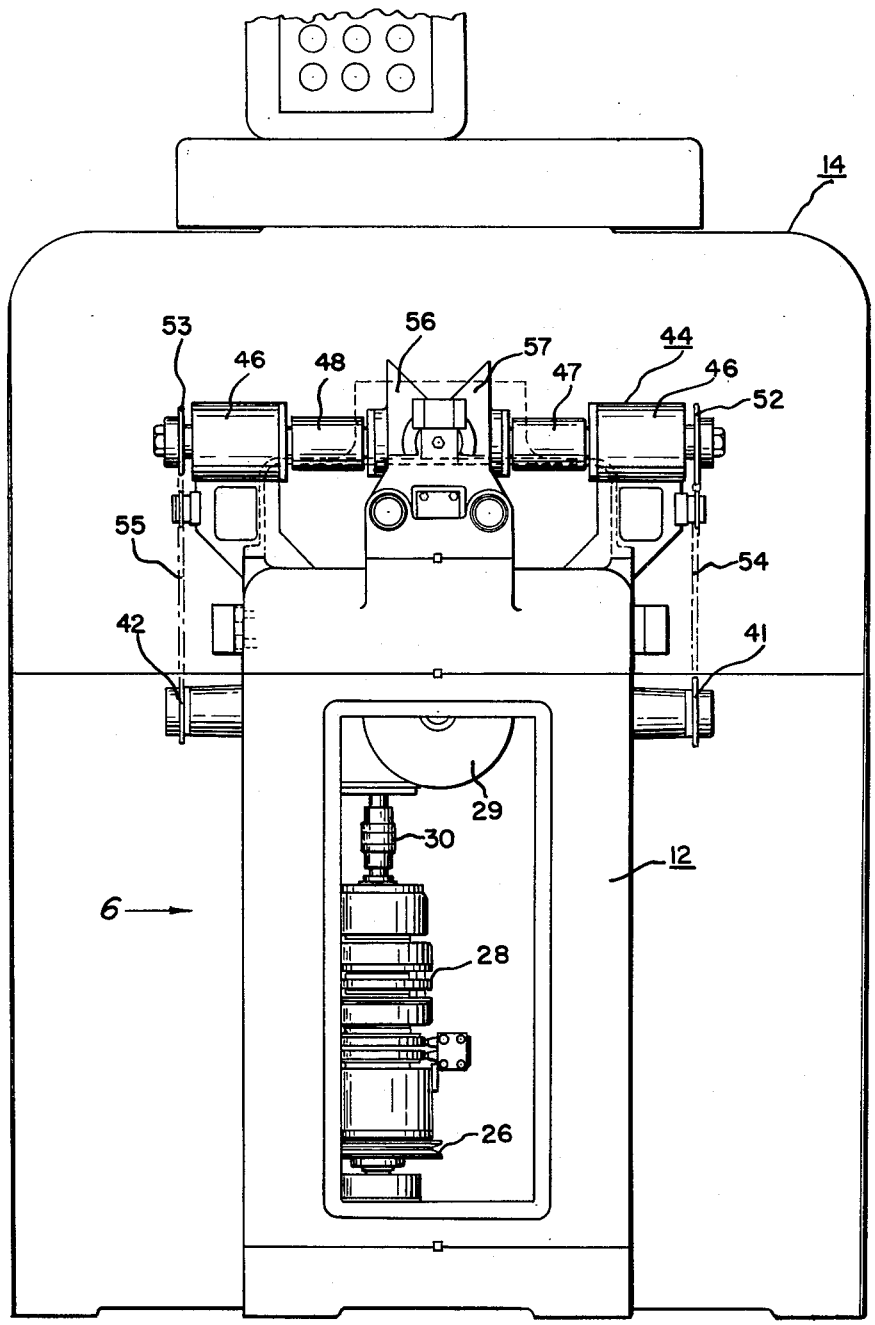
FIGURE 4 is a front view of the armature winder and staker made in accordance with this invention with some of the cover panels removed.
Figure 5:
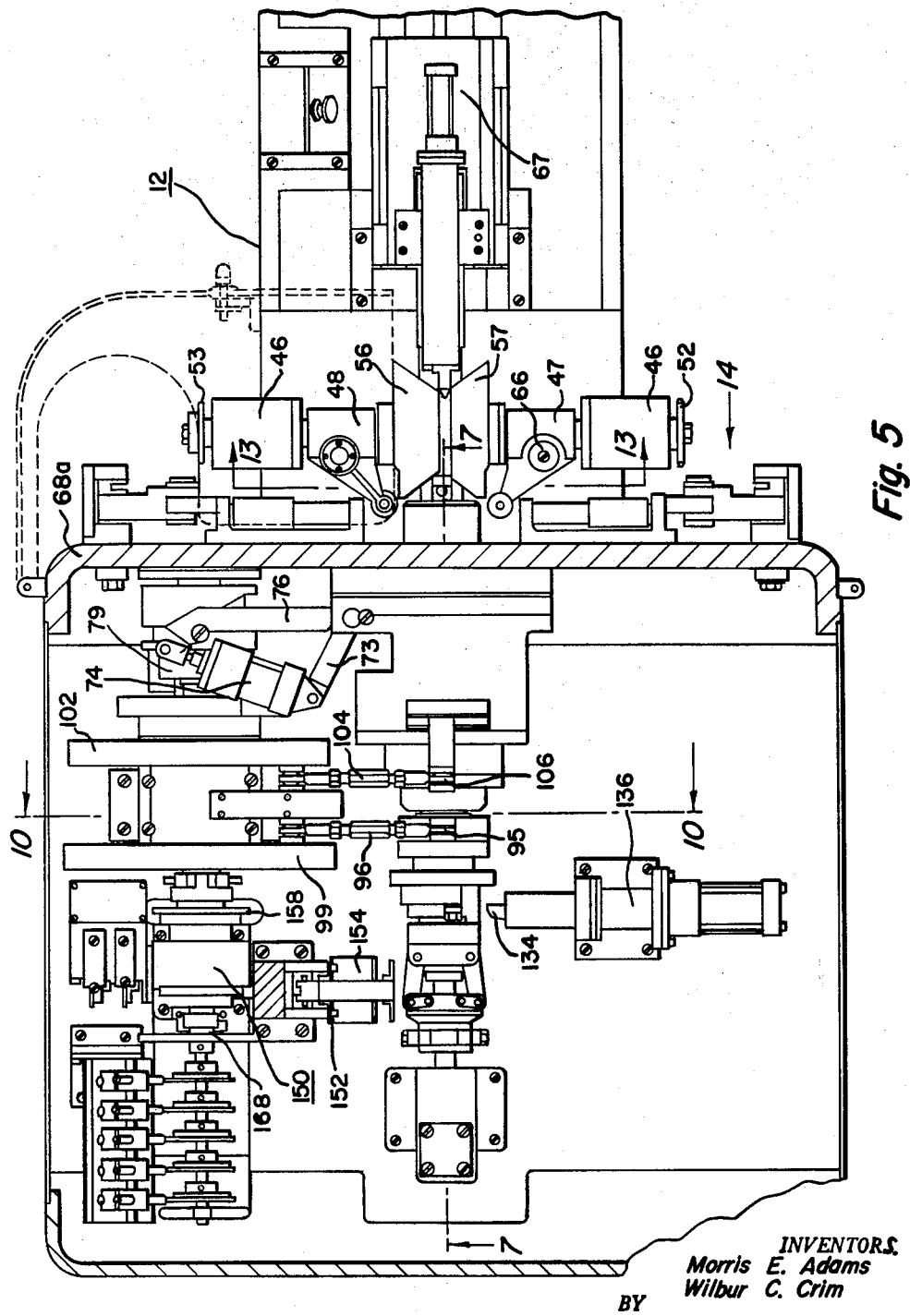
FIGURE 5 is a sectional view taken along line 5—5 of FIGURE 1.
Figure 6:
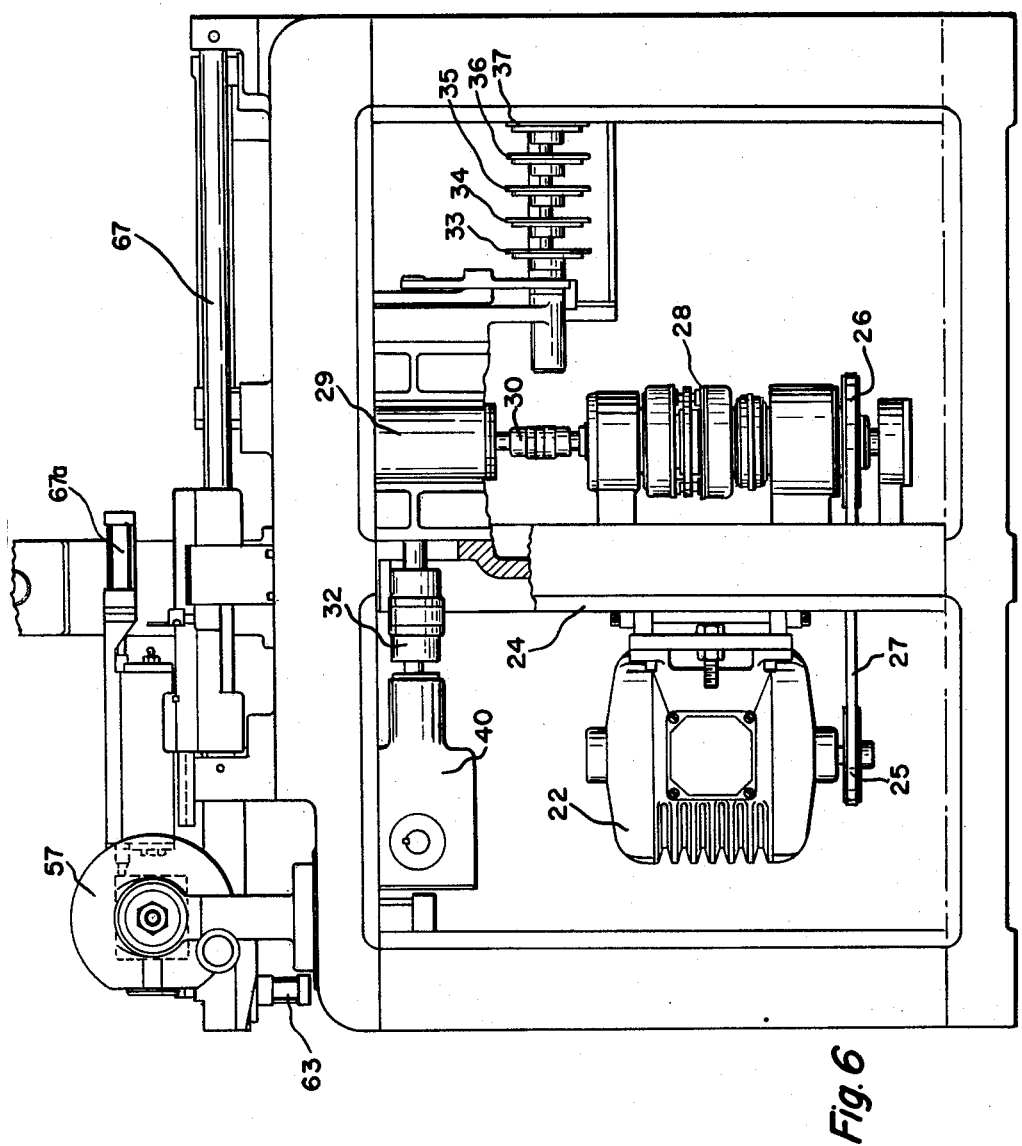
FIGURE 6 is a side view with certain panels removed of a portion of the armature winder and staker made in accordance with this invention.

Referring now more particularly to FIGURES 4, 5 and 6, it is seen that the front section of the armature winder and staker contains an electric motor designated by reference numeral 22. This electric motor is supported from wall 24 of the frame of the machine and has a pulley 25 connected with a pulley 26 through a belt designated by reference numeral 27. Pulley 26 is connected with a conventional electromagnetic brake and clutch designated by reference numeral 28 and the output side of this brake and clutch is connected with a gear box designated by reference numeral 29 via the shaft 30. The gear box 29 has a pair of output shafts one of which is designated by reference numeral 32 and the other of which drives a plurality of cams designated respectively by reference numerals 33, 34, 35, 36, 37, 38 and 39. It can be seen from FIGURE 19 that the gear box 29 has an output shaft 40 which drives the cams 33 through 39 through gears 41 and 42. Each cam operates a switch actuating member designated by reference numeral 43 which in turn operates an electrical switch designated by reference numeral 44.

As will become more readily apparent hereinafter the cam controllers 33 through 39 serve to control various operating functions of the armature winding and staker of this invention. It is apparent that these cam controllers will be driven by the electric motor 22 whenever the electromagnetic clutch 28 causes the shaft 30 to be driven from the pulley 26.

The output shaft 32 of gear box 29 is connected to input gearing located within a gear box designated by reference numeral 40. The output shaft of gear box 40 drives a pair of spur gears designated by reference numerals 41 and 42 which are better illustrated in FIGURE 4.

Figure 13:
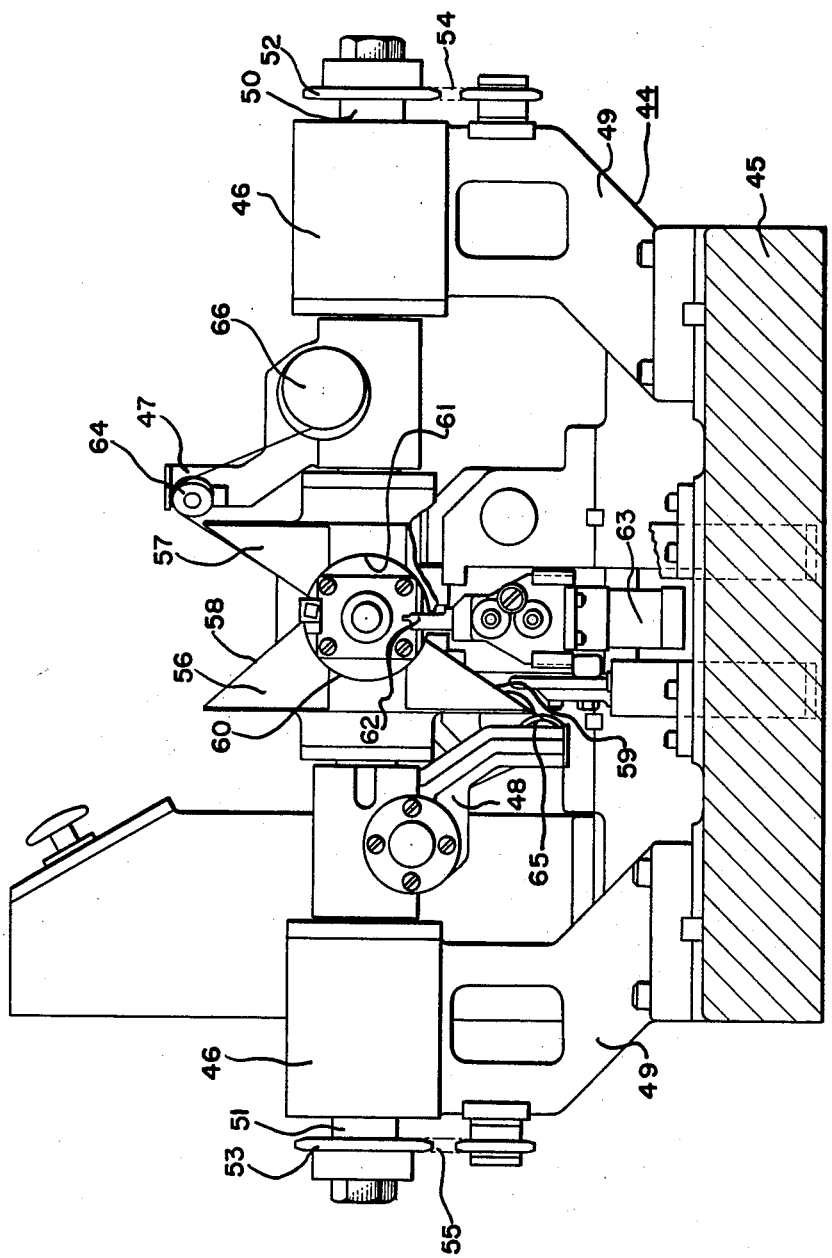
FIGURE 13 is a sectional view taken along line 13—13 of FIGURE 5.

The spur gears 41 and 42 drive a winding assembly which is generally designated by reference numeral 44 and which is shown in greater detail in FIGURE 13. The winding assembly is supported by a wall 45 of the main frame and includes a pair of bearings designated by reference numeral 46 which support flyer arms designated by reference numerals 47 and 48. It is seen that the bearings 46 are supported by brackets 49 and that the flyer arms are supported by shafts 50 and 51 journalled in bearings 46. These shafts 50 and 51 carry respectively spur gears 52 and 53. When the shafts 50 and 51 are rotated the flyer arms 47 and 48 are likewise rotated around the longitudinal axis of the shafts 50 and 51. The spur gears 52 and 53 of the winding assembly are connected respectively with spur gears 41 and 42 via chains 54 and 55. It thus can be seen that the flyer arms 47 and 48 are rotatably driven by the electric motor 22 through the electromagnetic brake and clutch 28 and through gear boxes 29 and 40.

The winding assembly as is better illustrated in FIGURE 13 includes a pair of winding heads designated by reference numerals 56 and 57. It is seen that the winding head 56 has inclined surfaces 58 and 59 which serve to direct wire into the armature core. The winding head 56 has an arcuate recess designated by reference numeral 60 as is clearly apparent from FIGURE 13. The winding head 57 in a like manner has a pair of inclined surfaces and has an arcuate recess 61 located directly across from the recess 60 of winding head 56. The opening in winding heads 56 and 57 provided by the recesses 60 and 61 is sized to permit the insertion of the core of an armature assembly. A locating pin designated by reference numeral 62 is adapted to project into a commutator slot when the armature assembly is positioned so that the core thereof is within the recesses 60 and 61. This locating pin 62 is operated by a fluid pressure motor designated by reference numeral 63.

The flyer arms 47 and 48 carry respectively pulleys 64 and 65 which carry the wire that is applied to the armature core. It can be seen that this wire is caused to become engaged with the inclined surfaces of winding heads 56 and 57 during rotation of the flyer arms 47 and 48. The wire carried by the pulleys 64 and 65 is fed thereto from pulleys designated by reference numeral 66 which are carried by the flyer arms 47 and 48. The wire is fed to the pulleys 66 through the shafts 50 and 51 which each have a longitudinally extending passage and are fed from a suitable wire tensioning device not shown. It is seen that the armature assembly designated in its entirety by reference numeral 44 is mounted on the front section of the armature winder and staker closely adjacent the vertical wall designated by reference numeral 68a. It is seen from FIGURES 5 and 6 that the front section 12 of the armature winder and staker also includes a chucking mechanism for moving the unwound armature assembly into the winding heads 56 and 57, this chucking mechanism including the fluid motor designated by reference numeral 67 for accomplishing this result. A fluid motor 67a is provided which operates an identification stamp mechanism for stamping the armature core.

Figure 7:
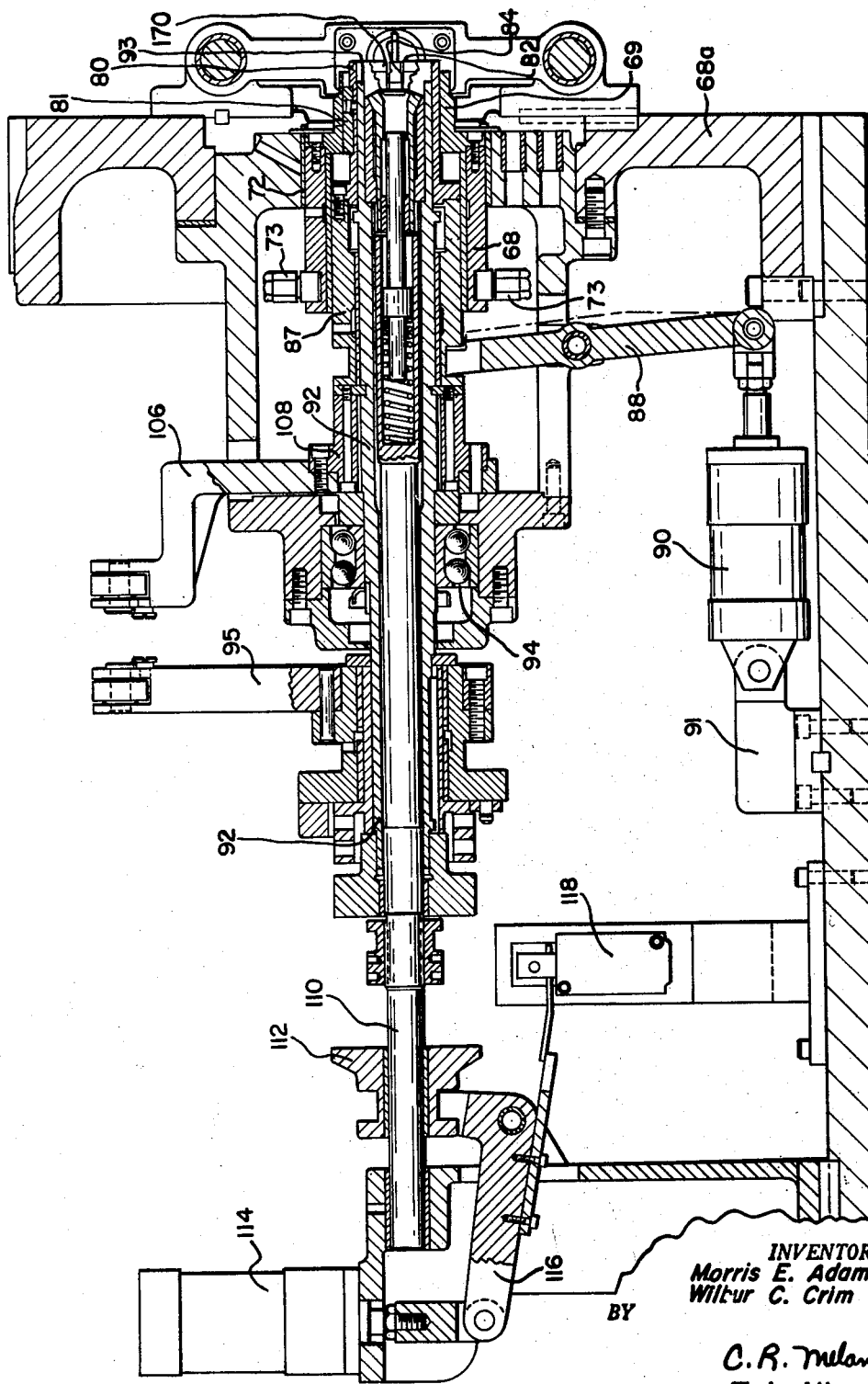
FIGURE 7 is a sectional view taken along line 7—7 of FIGURE 5.
Figure 8:
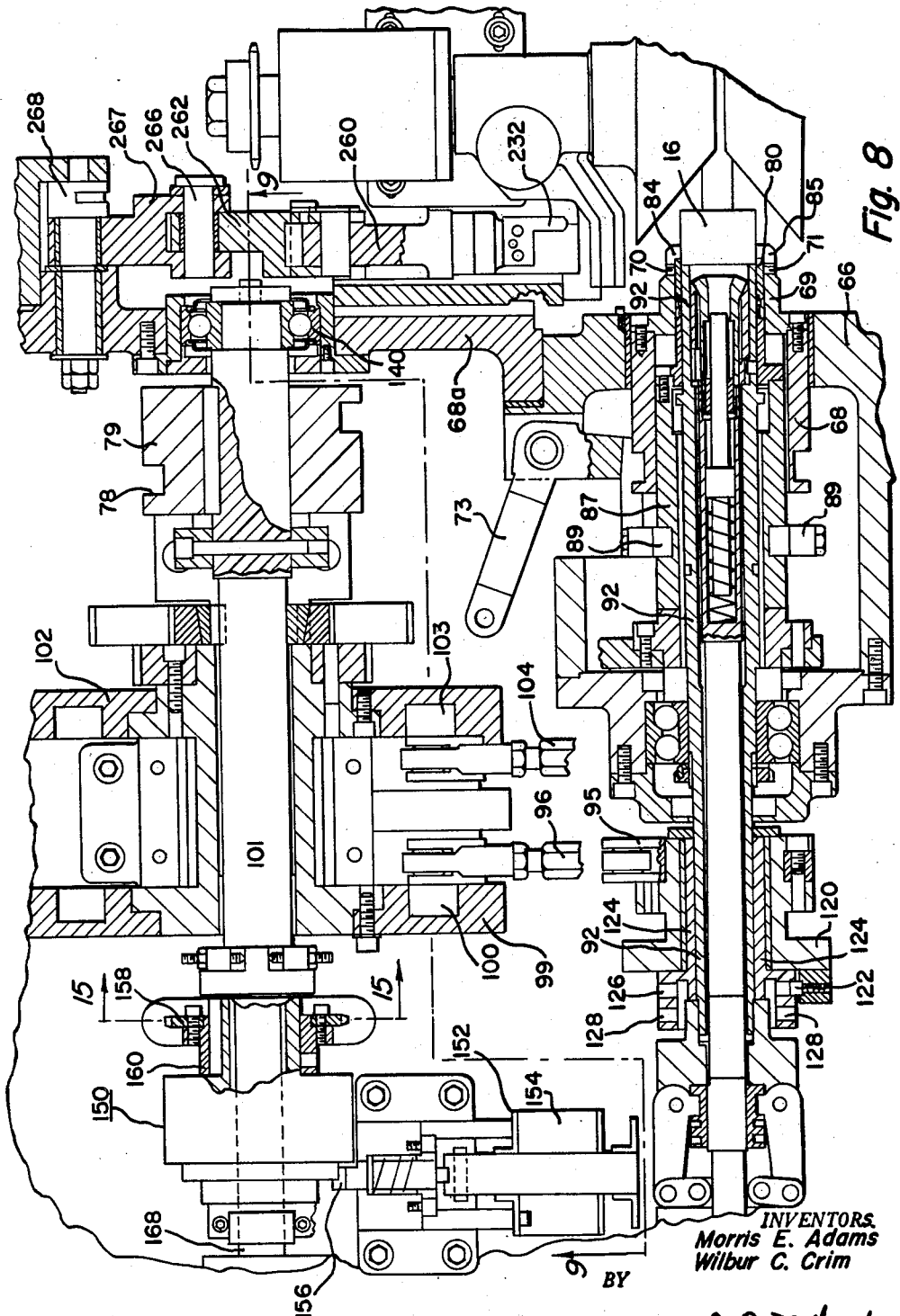
FIGURE 8 is a view partly in section showing a portion of the armature winder and staker of this invention.
Figure 8B:
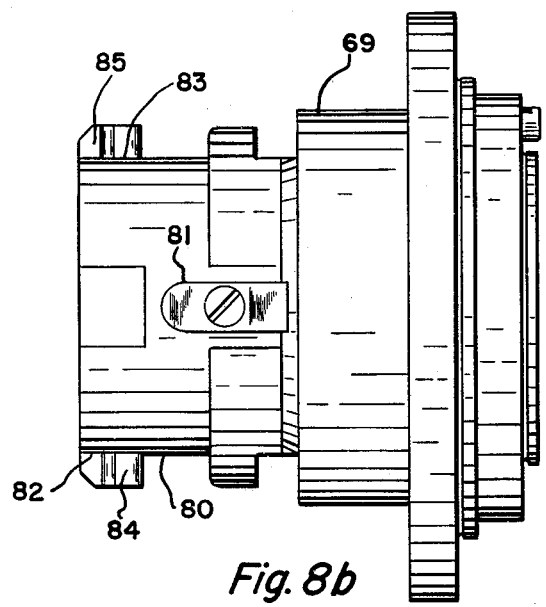
Figure 8A:
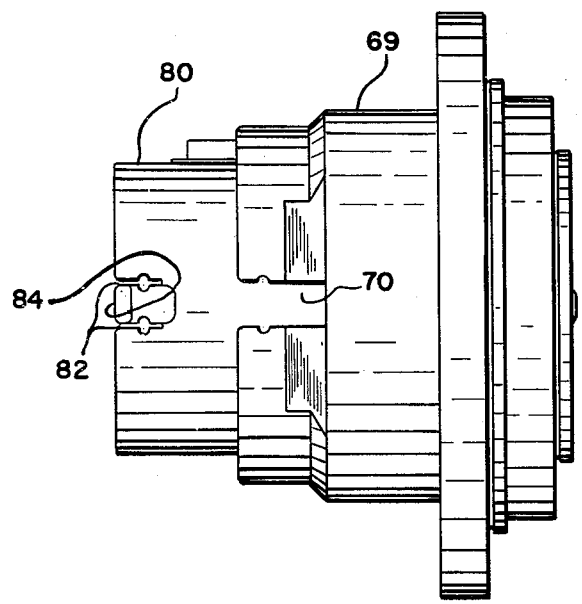
FIGURE 8a is a side view of the looping horn and gripping sleeve of the armature winder and staker of this invention.

Referring now more particularly to FIGURES 5 and 8 the armature winder and staker of this invention includes means for forming a loop of wire located in alignment with slots of commutator 16 and then simultaneously severing the wire while driving the ends of the conductors into the commutator slots. A portion of this mechanism is supported by the frame part designated by reference numeral 66 in FIGURES 5 and 8. As shown in FIGURE 8, the frame part supports a sleeve designated by reference numeral 68 which is connected with a gripping sleeve designated by reference numeral 69. The gripping sleeve 69 which is illustrated in greater detail in FIGURES 8a and 8b is cylindrical in shape and has a pair of slots 70 and 71 cut therein which are located at opposite sides of the sleeve. The sleeve 69 and its slotted portions 70 and 71 are also illustrated in FIGURES 7 and 8a and in the enlarged views of FIGURES 21 through 25. As will become more readily apparent hereinafter, the slots 70 and 71 are adapted to slip over a pair of looping horns to tightly grip the wire during the staking operation.

Figures 11, 12:
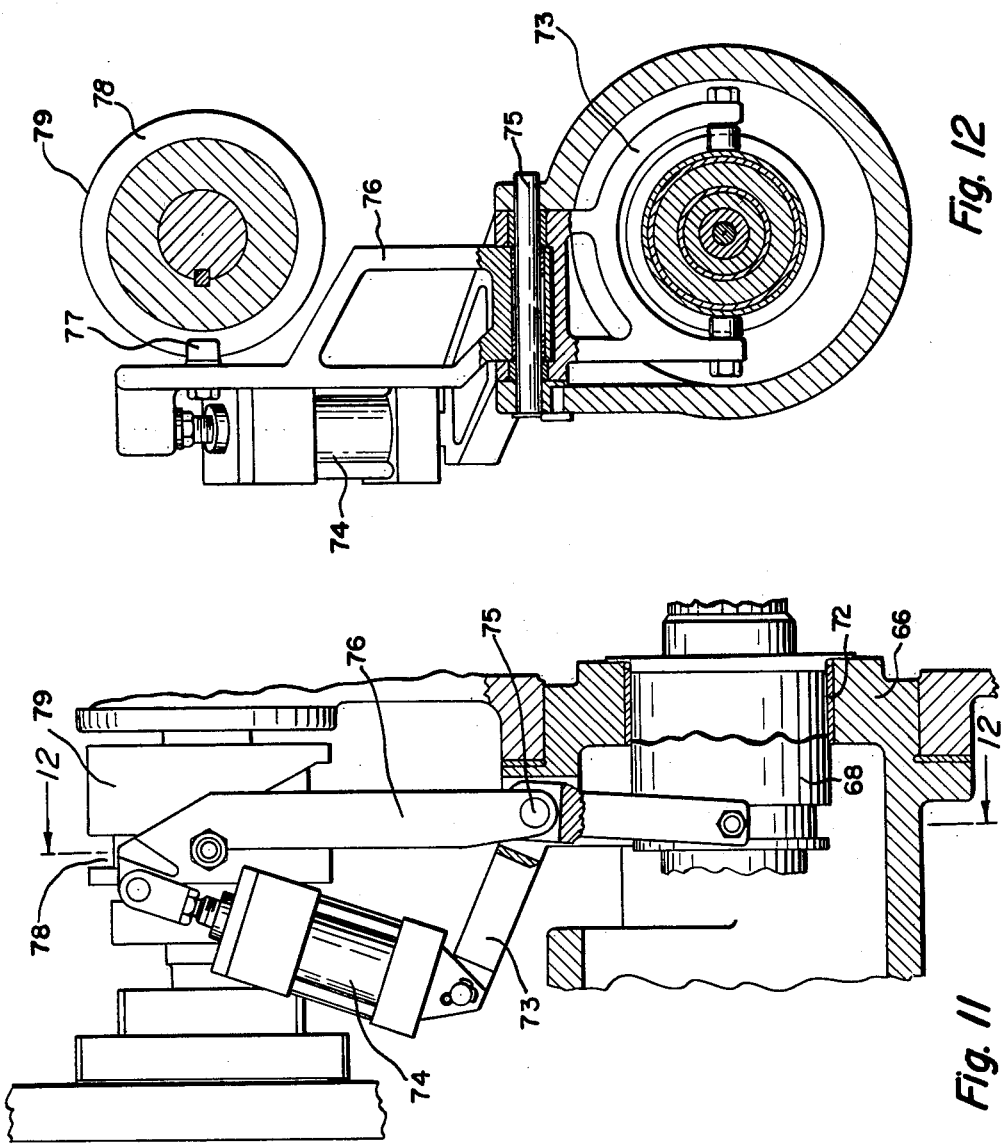
FIGURE 11 is an enlarged view of a portion of the apparatus illustrated in FIGURE 5.
FIGURE 12 is a sectional view taken along line 12—12 of FIGURE 11.

The sleeve 68 is slidable within a bearing 72 supported in the frame part 66. The sleeve 68 is moved axially by a bell crank lever designated by reference numeral 73 and shown in greater detail in FIGURES 11 and 12. It is seen from FIGURES 11 and 12 that the bell crank lever 73 has one end thereof connected to move the sleeve 68 and has its opposite end thereof connected with a fluid pressure motor designated by reference numeral 74. The bell crank lever 73 is pivoted on a pin designated by reference numeral 75 as is clearly apparent from FIGURE 12. The opposite end of fluid motor 74 is connected with a link designated by reference numeral 76. The opposite end of bracket or link 76 is pivoted to the pin 75 as is clearly apparent from FIGURE 12. The bracket 76 carries a pin member designated by reference numeral 77 that is fitted within a cam groove 78 formed in a cam member designated by reference numeral 79. The cam 79 and its groove is better illustrated in FIGURE 9 of the drawings. When the cam 79 is rotated the pin member 77 is oscillated to cause an oscillating movement of the bell crank lever 73 and a consequent oscillating movement of the sleeve member 68. As the cam member 79 rotates the sleeve member 68 will be projected forward to move the gripping sleeve 69 forward and at other times the sleeve members 68 and 69 will be moved rearward depending upon the position of the cam member 79. It will be appreciated that sleeve members 68 and 69 may also be projected forward by an actuation of fluid motor 74 which swings the bell crank lever 73 around the pivot pin 75 to move the sleeve members 68 and 69 either forward or backward.

The gripping sleeve 69 carries a second sleeve designated by reference numeral 80 which may be termed a looping horn member. The gripping sleeve 69 and the looping horn member 80 are keyed together by a key designated by reference numeral 81. The sleeve 80 has a pair of slots designated by reference numeral 82 and 83 and better illustrated in FIGURES 8a, 21 and 23 of the drawings. Positioned within the slots 82 and 83 and projecting outwardly therefrom are looping horns designated by reference numerals 84 and 85 also better illustrated in FIGURES 8b, 21 through 23. These looping horns 84 and 85 as is apparent from FIGURE 8b have a portion thereof fitted within the slots located in sleeve 80 and have portions projecting outwardly therefrom which at times slide into the slots 70 and 71 formed in the gripping sleeve 69.

The sleeve 80 is connected with a sleeve designated by reference numeral 87 as is clearly apparent from FIGURES 7 and 8. The sleeve 87 is moved forwardly and rearwardly by a lever designated by reference numeral 88 having portions 89 engaging the sleeve 87. The lever 88 is connected with a fluid pressure operated motor designated by reference numeral 90 and pinned to a support member designated by reference numeral 91. It will be apparent that when the fluid pressure operated motor is actuated in one direction, the sleeves 87 and 80 will be moved forwardly and when the fluid pressure motor is actuated in an opposite direction the sleeves 87 and 80 will be moved rearwardly. It also will be apparent that the sleeves 69 and 80 rotate together as they are keyed to one another.

Figure 10:
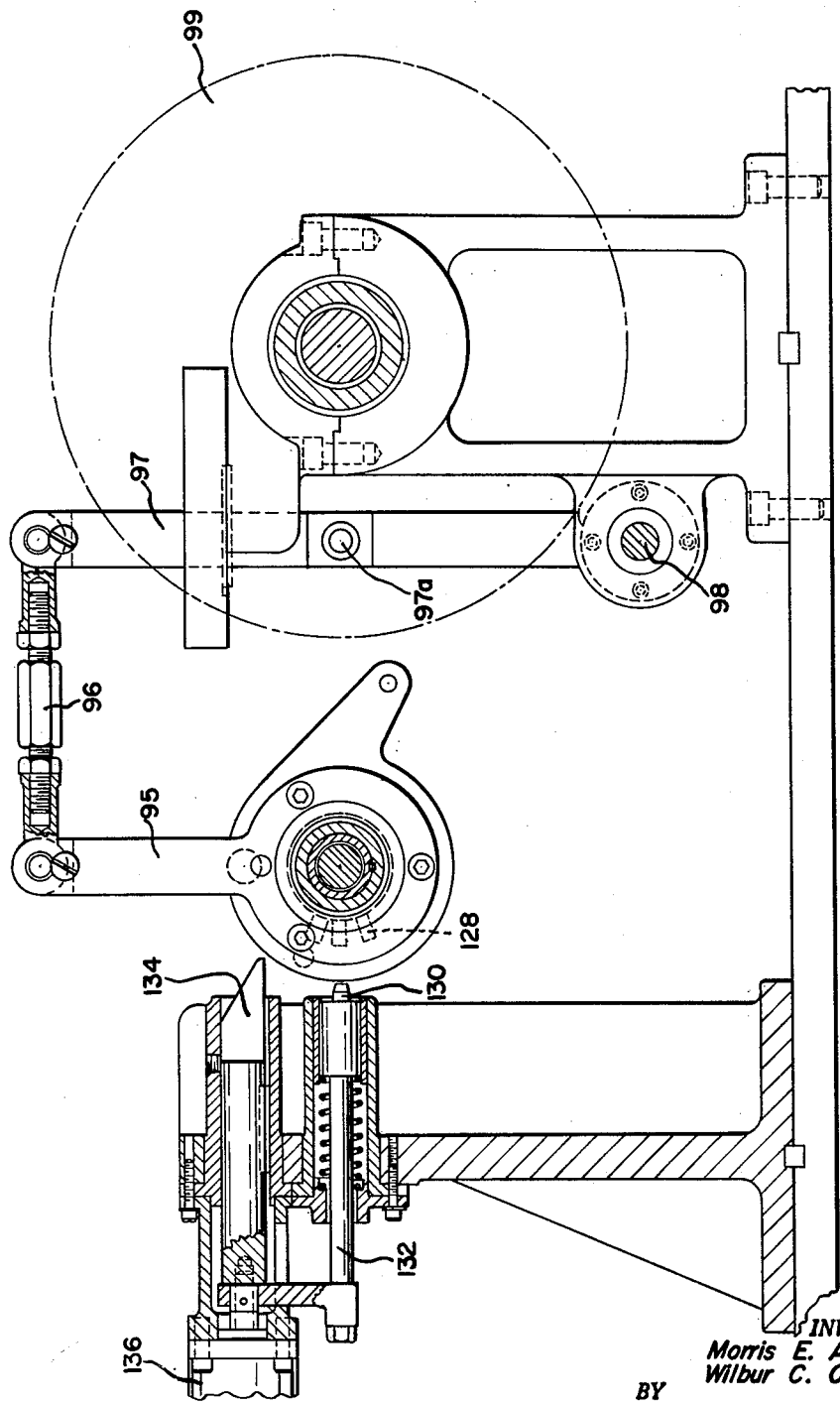
FIGURE 10 is a sectional view taken along line 10—10 of FIGURE 5.

Referring now more particularly to FIGURE 7, it is seen that an elongated central sleeve designated by reference numeral 92 is provided. The sleeve 92 has a roughened end portion 93 which is adapted to engage one face of the commutator 20 as is better illustrated in FIGURE 8. The sleeve 92 is journalled in a bearing designated in its entirety by reference numeral 94 and having an outer race supported by part of the machine frame. The sleeve 92 is connected to rotate with an arm member designated by reference numeral 95. The arm 95 is connected with a lever designated by reference numeral 96 and the opposite end of this lever is connected with a lever 97 which is pivoted as at 98 to the frame of the machine as is illustrated in FIGURE 10. The lever 97 carries a projection 97a that rides in a cam groove 100 formed in a cam controller designated by reference numeral 99. As the cam 99 rotates the lever 97 is oscillated around pivot point 98 and the lever 95 likewise is oscillated in accordance with the movement of lever 97. The cam groove in barrel cam 99 is designated by reference numeral 100 in FIGURE 8.

It can be seen from FIGURE 8 that the barrel cam member 99 is connected to rotate with a shaft designated by reference numeral 101 and that this shaft 101 also rotates a second barrel cam member designated by reference numeral 102 and having a cam groove 103. The barrel cam member 102 oscillates an arm designated by reference numeral 104 and better illustrated in FIGURE 8. The arm 104 is shown in FIGURES 5 and 8 and is connected with a crank arm designated by reference numeral 106 and illustrated in FIGURES 5 and 7.

It is seen from FIGURE 7 that the arm 106 is connected with a sleeve 108 which is, in turn, connected to drive the sleeve 87. When the arm 106 is oscillated from the barrel cam 102, both the sleeves 69 and 80 will be likewise oscillated. It thus is apparent that when the shaft 101 is rotated the barrel cams 99 and 102 will likewise be rotated to impart oscillation to crank arms 95 and 106 and oscillatory movement to sleeves 92, 69 and 80.

It can be seen from FIGURES 7 and 8 that the sleeve 92 contains a suitable collet mechanism including the shaft 110, the member 112, the fluid pressure motor 114 and the arm 116 which is driven by the fluid pressure actuated motor 114. The arm member 116 actuates an electrical switch designated by reference numeral 118 as is clearly apparent from FIGURE 7.

The arm 95, as is apparent from FIGURE 8, is connected to drive a sleeve member designated by reference numeral 120 which pivotally carries a clutch pin designated by reference numeral 122. A sleeve member designated by reference numeral 124 is keyed to the elongated sleeve 92 so that they rotate together. It is seen that the sleeve 124 has a plurality of openings designated by reference numeral 126, the clutch pin 122 fitting in one of these openings so that sleeve member 120 will drive the sleeve member 92 through sleeve 124. It is seen from FIGURE 8 that the sleeve member 124 also has a plurality of openings designated by reference numeral 128.

These openings are also illustrated in FIGURE 10 and are shown located in alignment with a pin designated by reference numeral 130 which is moved by a rod 132. The rod 132 and a plunger 134 are both moved by a fluid pressure operated motor designated by reference numeral 136.

When the fluid pressure motor is not actuated to move the plunger 134 and the pin 130, the sleeves 120 and 124 move together because of the engagement of clutch pin 122 within one of the pin openings 126. When the fluid motor 136 is actuated, the plunger member 134 moves in a direction to move the clutch pin 122 out of one of the openings 126 and to cause the pin 130 to enter one of the openings 128. With pin 130 in one of the openings 128 the sleeve member 124 is prevented from rotating and the sleeve member 120 may then be moved relative to the sleeve member 124 whereupon the clutch pin 122 is permitted to fall back in one of the openings 126 to provide an indexing of the sleeve member 92 through the arm 96 and barrel cam member 99. This arrangement provides for indexing of the armature core due to the rotation of sleeve 92 which rotates the armature core by reason of its engagement with the commutator 16.

Referring now particularly to FIGURES 5, 8 and 9, it is seen that the shaft 101 not only drives barrel cams 99 and 102, but also drives the cam member designated by reference numeral 79 and having the cam groove 78. The end of shaft 101 is journalled within a bearing designated in its entirety by reference numeral 140 and supported in the frame member 66.

Figure 15:
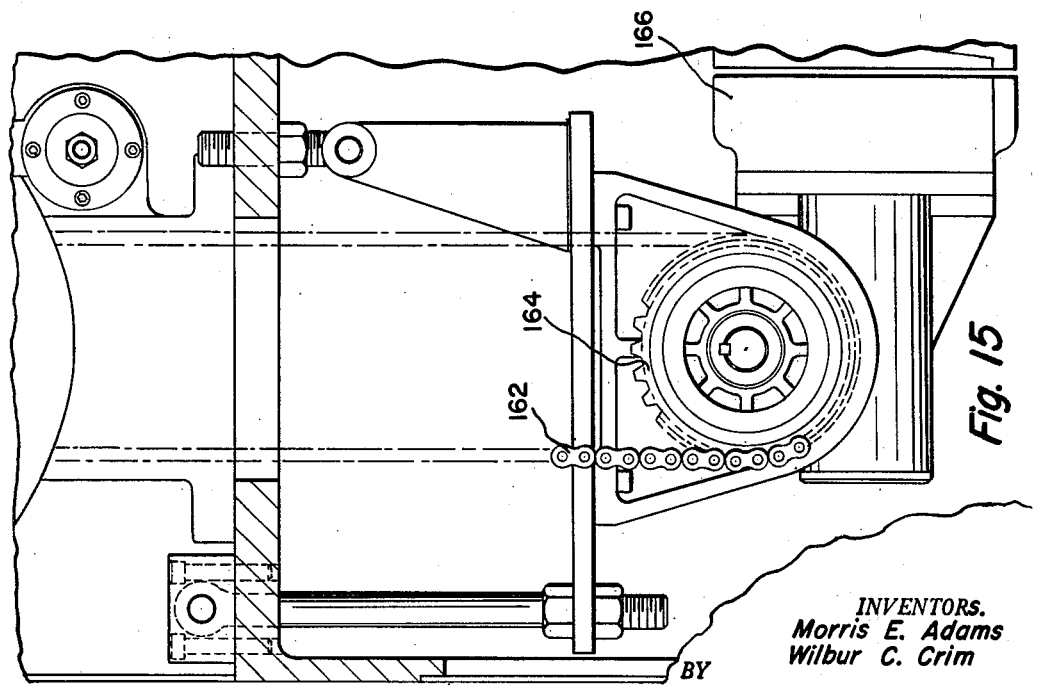
FIGURE 15 is a view of a portion of the apparatus illustrated in FIGURE 8.

The shaft 101 is driven through a conventional one-turn clutch designated in its entirety by reference numeral 150. The one-turn clutch includes a solenoid designated by reference numeral 152 having a coil winding 154 and a plunger that operates a pin member designated by reference numeral 156. The input to the clutch 150 is taken from a gear designated by reference numeral 158 that drives a sleeve designated by reference numeral 160. The gear 158 is driven by a chain designated by reference numeral 162 and shown in FIGURE 15. The chain 162 is driven by a gear 164 which is, in turn, driven by an electric motor designated by reference numeral 166. The clutch 150 at times drives both the shaft 101 and a shaft designated by reference numeral 168. When the clutch 150 is actuated the shaft 101 and 168 will both be driven from gear 158. When the clutch is not actuated the gear 158 freewheels so that neither the shaft 101 nor the shaft 168 are driven.

Figure 16:
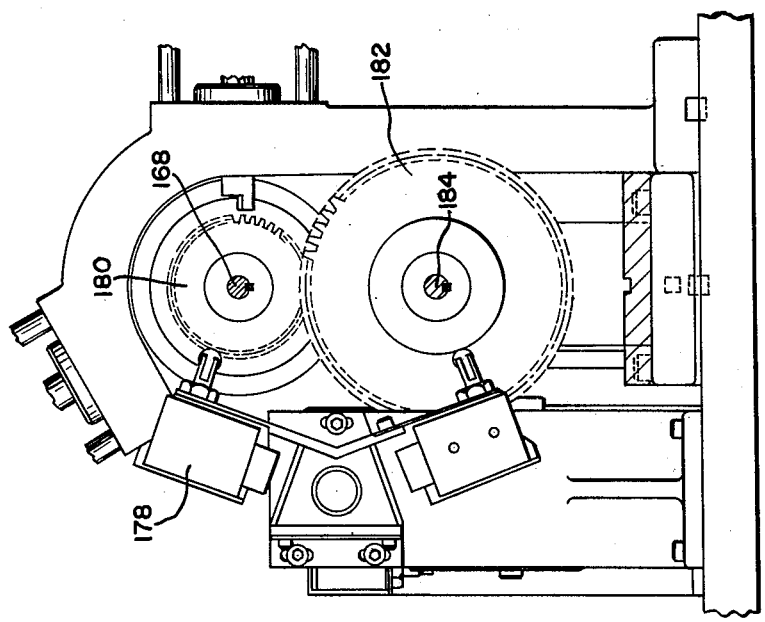
FIGURE 16 is an end view of one of the cam controllers of the combined armature winder and staker of this invention.

Referring now more particularly to FIGURES 16, 17 and 18, it is seen that the shaft 168 coming from one side of the one-turn clutch 150 carries a plurality of cam actuators designated respectively by reference numerals 170, 172, 173 and 174. The cam actuators 170 through 174 operate electrical switches designated respectively by reference numerals 175, 176, 177 and 178. The shaft 168, as is seen in FIGURE 16, drives a gear designated by reference numeral 180 which is mesh with a gear designated by reference numeral 182. The gear 182 drives a shaft 184 which, in turn, drives a plurality of cams designated respectively by reference numerals 186, 188, 190, 192 and 194. It is seen that the cams 186, 188 and 190 cooperate with switches designated respectively by reference numerals 196, 198 and 200. The cams 192 and 194 are spare cams that may be used if additional switches are needed to control the operation of the armature winder and staker. It is seen from FIGURE 18 that the shaft 184 drives a gear 202 which, in turn, drives a gear designated by reference numeral 204. The gear 204 drives a shaft 206 which carries cams designated respectively by reference numerals 208, 210 and 212. The cams 208, 210 and 212 respectively actuate electric switches 214, 216 and 218. It will be apparent that when the one-turn clutch operates to drive the shaft 168 the various cams illustrated in FIGURES 16 through 18 are moved to operate the switches with which they cooperate. It also can be seen that when the one-turn clutch 150 is actuated the shaft 101 is driven to drive barrel cams 99, 102 and 79.

Figure 14:
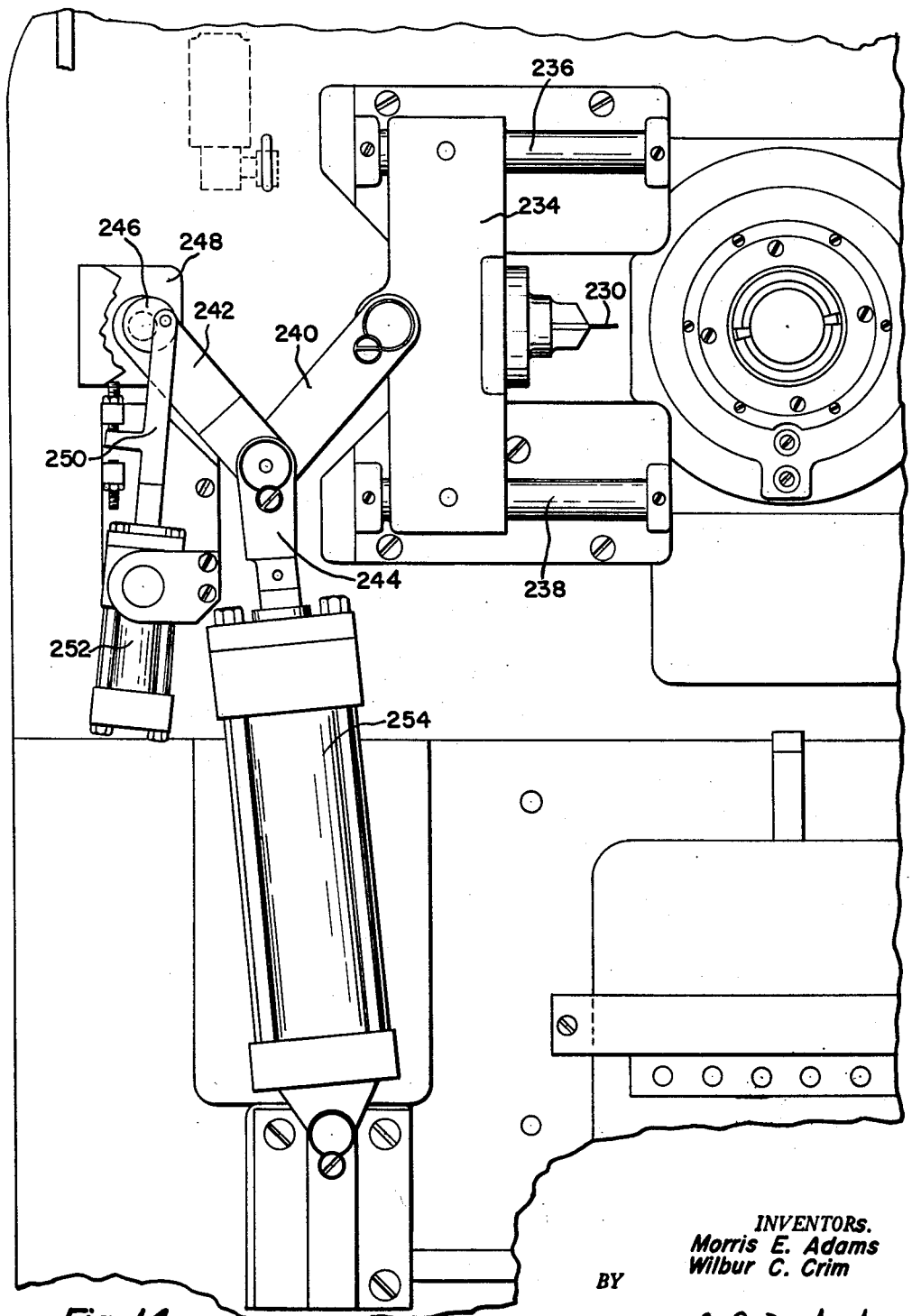
FIGURE 14 is an enlarged view of a portion of the apparatus illustrated in FIGURE 5.
Figure 23:
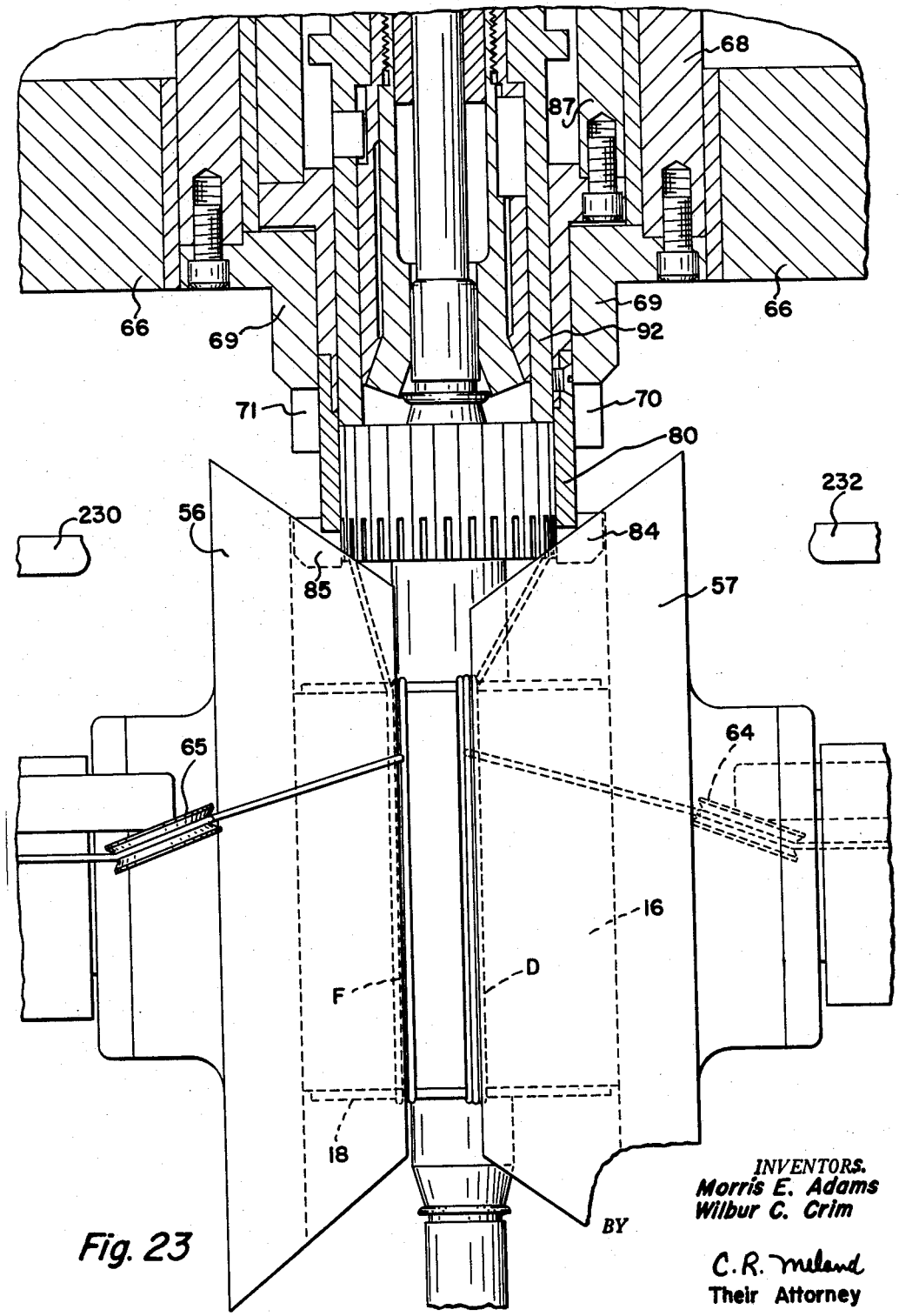

The staking mechanism for driving the conductors from between the gripping sleeve and the looping horn and into a commutator slot is best illustrated in FIGURES 8 and 14 of the drawings. The ends of the staking blades in relation to the other parts of the armature winder are also illustrated in FIGURES 21 and 23. The staking mechanism illustrated in FIGURE 14 and in FIGURES 21 through 23 includes a pair of staking blades designated by reference numerals 230 and 232 which are positioned on opposite sides of the commutator 16 and on opposite sides of the sleeves 69 and 80. The staking blades 230 and 232 are in exact alignment with each other and are caused to move inwardly to drive conductors into the commutator slots. The driving mechanism for the staking blade 230 is illustrated in FIGURE 14, it being understood that there is an identical mechanism for moving the staking blade 232.

The staking blade 230 is supported by a member designated by reference numeral 234 that is slidable on guide rods 236 and 238. The guide rods 236 and 238 are fixed with respect to the frame of the machine and thus guide the staking blade 230 along a predetermined path. The movable member 234 is pivotally connected with a link 240 which is pivotally connected with link 242 and a rod 244. The opposite end of link 242 is pivotally connected with an eccentric pin 246 which rotates within a part 248 fixed with respect to the frame of the machine. The eccentric pin 246 is rotated by a rod member 250 which is driven by fluid pressure operated motor 252. The rod member 244 is driven by a fluid pressure motor designated by reference numeral 254, one end of which is fixed with respect to the frame member.

It can be seen from FIGURE 14 that when the fluid pressure motor 254 is actuated in one direction, the links 240 and 242 are moved to a position wherein they straighten out thus causing the block or support member 234 to drive the staker 230 to the right, as viewed in FIGURE 14. During the upward movement of rod 244 it is apparent that the links 240 and 242 will straighten out into alignment with each other to cause a rightward movement of staking blade 230 but as the rod 244 continues in its upward movement the links 240 and 242 will begin to pivot and will pull the support member 234 and staking blade 230 leftwardly. This occurs on one upward stroke of the rod 244. When the rod 244 moves downwardly the staking blade 230 will be first moved to the right and will then be returned to its position illustrated in FIGURE 14. It thus is apparent that upon one upward and downward movement of the rod 244 the staking blade 230 will be moved rightwardly twice to cause two staking operations. The throw of the staking blade 230 or its amount of movement to the right depends upon the adjustment of the eccentric 246 with respect to the link 242. This throw is thus adjustable by operation of the fluid pressure motor 252.

The staking balde 232 illustrated in FIGURE 8 is likewise connected with a fluid motor for moving it to cause a staking operation. The staking blade 232, illustrated in FIGURE 8, is carried by the movable member 260 which is pivoted to link 262. The link 262 is pivoted to link 264 by a pin 266. It can be seen that the link 264 is pivoted to an eccentric pin designated by reference numeral 268 which is adjustable by a fluid motor and which performs the same function as the eccentric pin 246 shown in FIGURE 14. The staking mechanism for staking blade 232 is identical with the staking mechanism for staking blade 230 illustrated in FIGURE 14.

Figure 30:
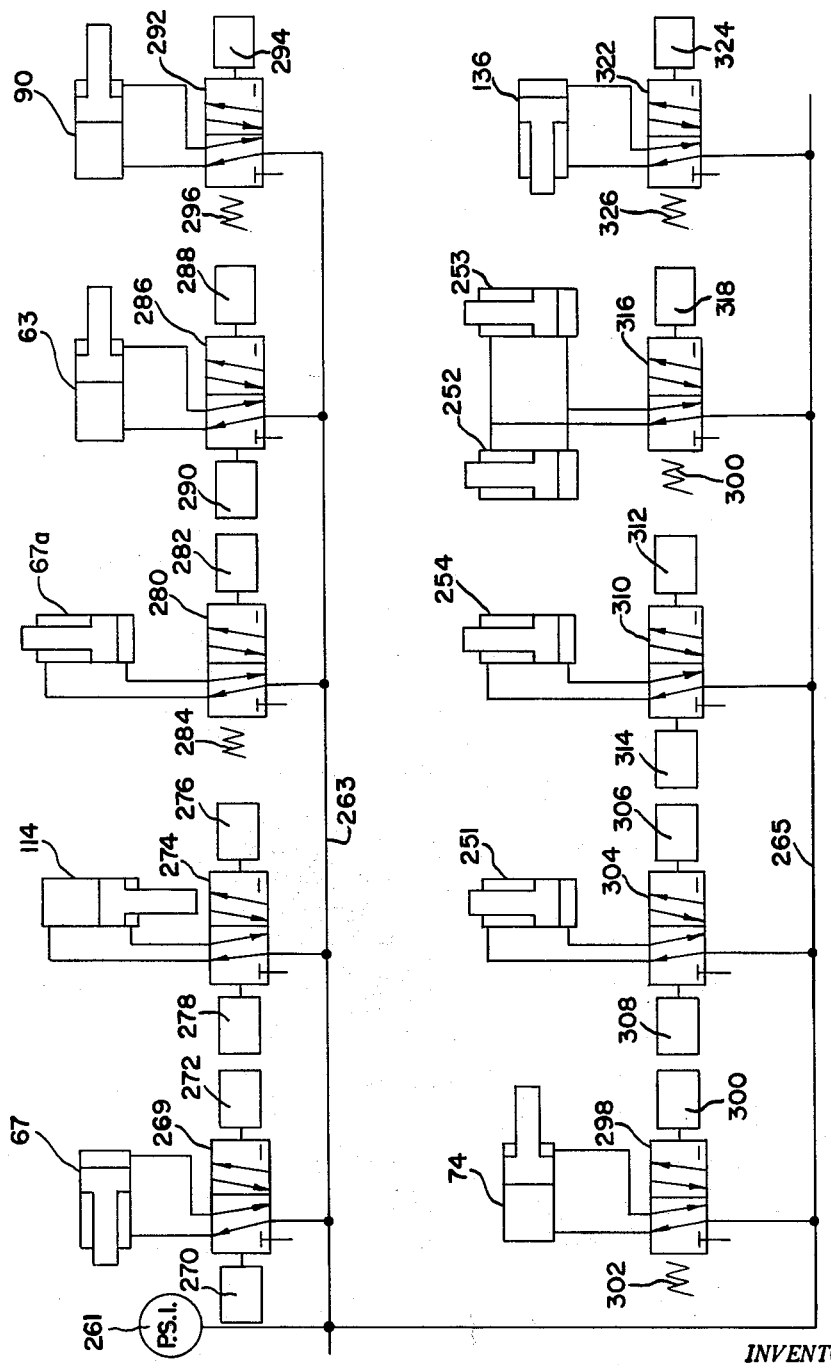
FIGURE 30 is a schematic diagram illustrating the hydraulic control circuit for the various fluid motors that are used with the armature winder and staker of this invention.

Referring now to FIGURE 30, a schematic fluid circuit diagram is illustrated for applying fluid pressure to the various fluid motors that perform operating functions for the winding machine and staker of this invention. As seen in FIGURE 30 a source of air pressure is designated by reference numeral 261. This source of air pressure is connected with pipes designated respectively by reference numerals 263 and 265. The pipe 263 is connected with fluid motor 67 through a valve designated by reference numeral 269. The valve is illustrated schematically, it being understood that the arrows through the valves indicate the direction of flow of fluid pressure when the valve is in a predetermined position. The valve 269 is shifted by solenoids 270 and 272 which are illustrated in the electrical circuit diagrams of FIGURES 31 and 31a. When the valve 269 is in the position illustrated in FIGURE 30, the piston of motor 67 will be driven to the right. This will occur when the coil winding of solenoid 272 is energized. When solenoid 270 is energized, the valve 260 will be shifted so that the piston will move leftwardly in the cylinder.

In a similar manner, the fluid motor 114 is connected with pipe 263 through a valve 274 which is shifted by solenoids 276 and 278. The fluid motor 67a which operates the identification stamp is controlled by a valve 280 which is shifted by solenoid 282 against the bias of spring 284. The spring 284 normally holds the valve 280 in the position illustrated in FIGURE 30, but when the solenoid 282 is energized the valve will be shifted to cause the piston of fluid motor blank to operate in another direction.

The fluid motor 63 operates the locating pin and is controlled by a valve 286 which is shifted by solenoids 288 and 290. The fluid motor 90 operates the looping horn 80 and is controlled by a valve 292 that is shifted by solenoid 294 against the bias of spring 296. The valve 292 will normally be in the position illustrated in FIGURE 30 and will be shifted to its other position by solenoid 294 when it is energized.

The fluid motor 74 is fed from pipe 265 through a valve 298 that is shifted by solenoid 300 against the bias of spring 302. When the solenoid 300 is energized, the valve will be shifted from its position in FIGURE 30 and when the solenoid 300 is deenergized the valve is in the position of FIGURE 30 and is held there by the spring 302. The fluid motor 74 controls the gripping sleeve 69 of the armature winder and staker.

The fluid motor 251 operates one of the staking blades and is connected with pipe 265 through a valve 304 that is operated by solenoids 306 and 308. The fluid motor 254 operates the other staking blade and is connected with pipe 265 through valves 310 that are operated by solenoids 312 and 314.

The fluid motors 252 and 253 operate to position the staking blades for either the shallow stake or the deep stake. These fluid motors are controlled by a valve 316 which is operated by solenoid 318 against the bias of spring 320. The spring 320 holds the valve normally in the position illustrated in FIGURE 30 so that the fluid motors are biased downwardly. When the solenoid 318 is energized, the valve is shifted so that the fluid motors 252 and 253 are moved upwardly simultaneously.

The fluid motor 136 operates the armature indexing mechanism and is connected with the pipe 265 via a valve 322 that is operated by solenoid 324 against the bias of spring 326. The spring 326 normally holds the valve 322 in the position illustrated in FIGURE 30 and the valve is shifted against this spring bias by the solenoid 324 when it is energized.

Figure 31:
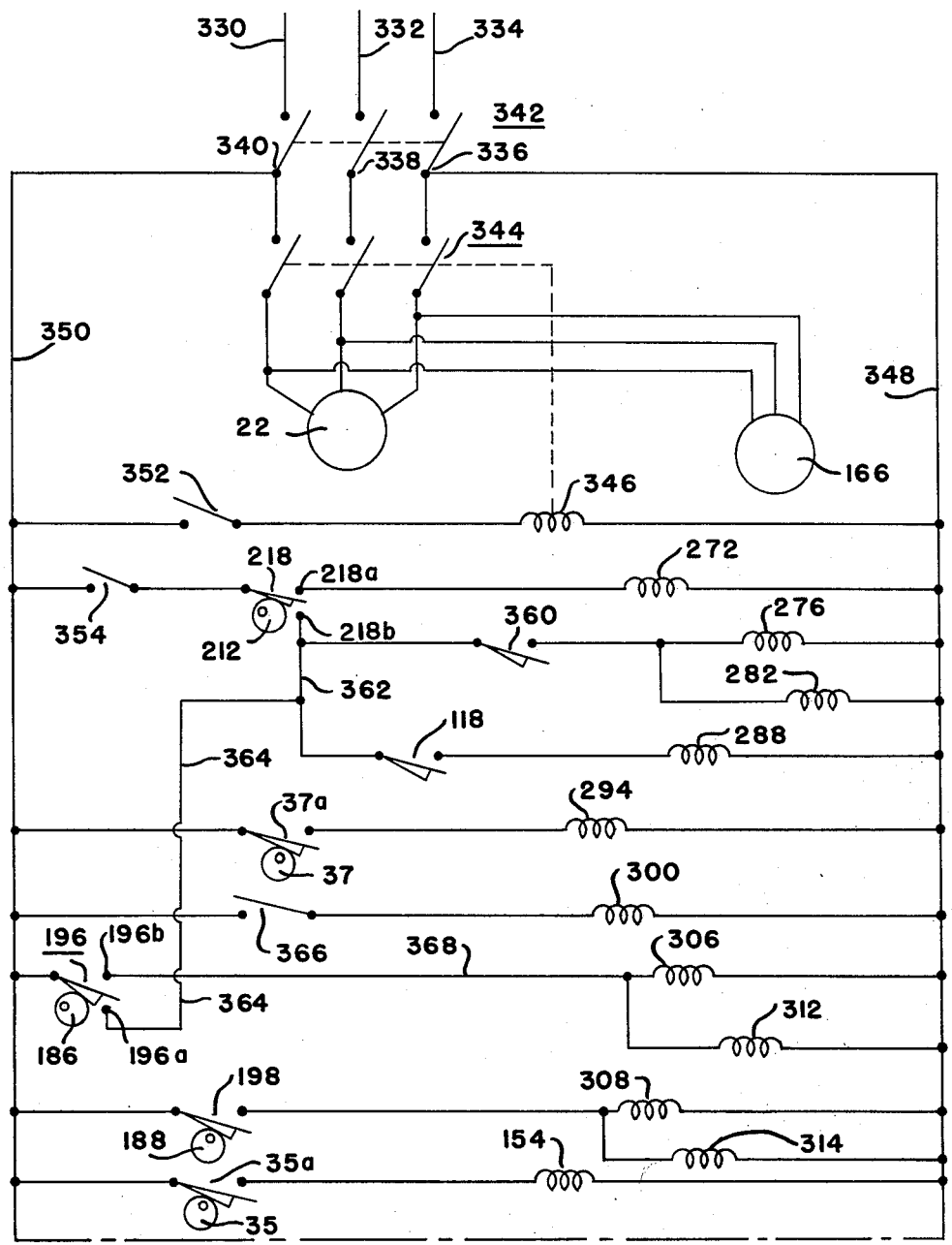
FIGURES 31 and 31a illustrate a schematic electrical circuit of the electrical circuitry for controlling the armature winder and staker of this invention.
Figure 31A:
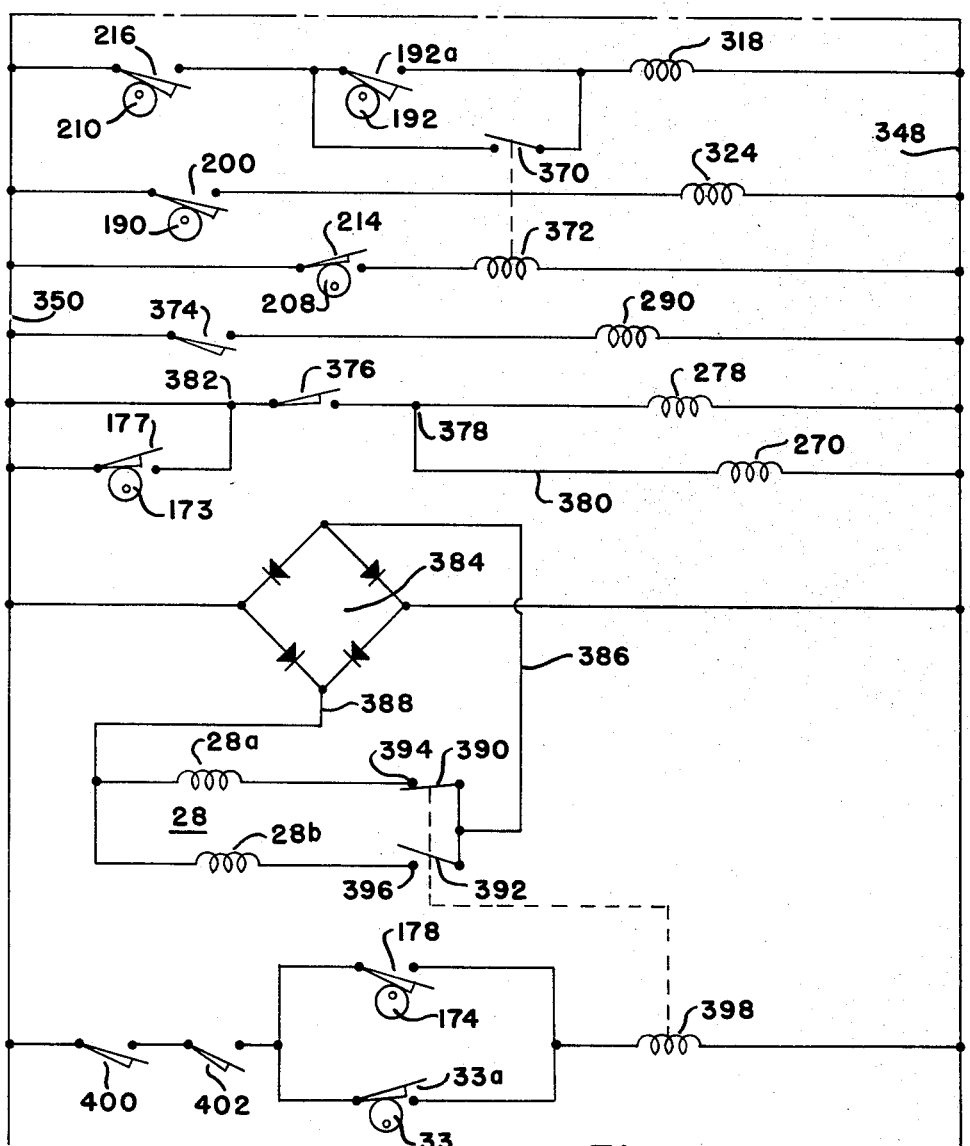

Referring now to FIGURES 31 and 31a, a schematic electric circuit diagram is illustrated for controlling the operation of the winder and staker of this invention. In the circuit diagram of FIGURES 31 and 31a, the input power lines are designated by reference numerals 330, 332 and 334. These power lines are connectable with junctions 336, 338 and 340 through a manually operable switch designated in its entirety by reference numeral 342. The junctions 340, 338 and 336 are connectable with electric motors 22 and 166 through a relay operated switch including movable contactors generally designated by reference numeral 344 which are operated by a coil designated by reference numeral 346. When the coil winding 346 is energized, the motors 22 and 166 will be connected with junctions 336, 338 and 340 and these motors will be then energized providing the switch 342 is closed.

The junction 336 is connected with a power conductor 348 whereas the junction 340 is connected with a power conductor 350. The power conductors 348 and 350 supply power to various solenoids to control the operation of the armature winder and staker.

In the circuit diagram of FIGURES 31 and 31a, the solenoids for operating the valves illustrated in FIGURE 30 are designated by the same reference numerals in each figure. In FIGURE 31, the solenoid 346 that controls the contactors 344 is connected in series with a manually operable switch designated by reference numeral 352. The solenoid 272 that operates valve 266 is connected across the power conductors 348 and 350 and is connected in series with cam operated switch 218 and a manually operable switch designated by reference numeral 354. The cam operated switch 218 is operated by cam 212 and the contactor of switch 218 alternately engages contacts 218a and 218b. The contact 218b is connected with a circuit that includes the solenoids 276 and 282 and a switch designated by reference numeral 360. The switch 360 is operated by the tail stock and when the tail stock is forward the switch 360 is closed. The switch 360 will be opened when the tail stock is moved to its back position. The contact 218b is connected with a lead wire 362 which is, in turn, connected to one side of switch 118. The switch 118 is moved to a closed position when the collet is closed and is opened when the collet is opened. It is seen that lead wire 362 is connected with a lead wire 364 which is, in turn, connected with contact 196a of a switch designated by reference numeral 196. The switch 196 is cam operated by a cam 186, as is clearly apparent from FIGURE 31.

The solenoid 294 which controls fluid motor 90 through the valve 293 is connected across the power conductors through cam operated switch 37a that is operated by the cam 37. The solenoid 300 which controls valve 298 is connected across the power conductors and in series with a manually operable switch 366. The solenoids 306 and 312 that control the staking blades are connected across the power conductors and in series with a lead wire 368. It is seen that the lead wire 368 is connected with contact 196b of switch 196. The solenoids 308 and 314 which control the down position of the staking blades are connected across the power conductors and in series with cam operated switch 198.

The solenoid coil winding 154 that controls the one-turn clutch is connected between the power conductors through cam operated switch 35a. The solenoid 318 shown in FIGURE 31a that controls the eccentric that, in turn, controls the depth of staking is connected across the power conductors and in series with cam operated switches 216 and 192a. It is seen that the cam operated switch 192a is bypassed by a circuit that includes a switch 370 operated by relay coil 372. The switch 370 is normally open, but when the relay coil 372 is energized, the switch 370 will be closed. The relay coil 372 is connected across the power conductors and in series with a cam operated switch 214.

The coil winding 324 that controls valve 322 and the armature indexing fluid motor 136 is connected across the power conductors through the cam operated switch 200. The solenoid 290 which controls the valve 286 and the fluid motor 63 that operates the locating pin is connected across the power conductors through a switch designated by reference numeral 374. The switch 374 will be closed when the armature to be wound is in place while at all other times the switch 374 is open. The solenoid 278, which controls valve 274 and which causes the collet to open when it is energized, is connected across the power conductors through a switch 376. The switch 376 is closed whenever the tail stock of the armature winder is returned to its back position and at all other times the switch 376 is in an open position. The junction 378 connected to switch 376 is connected with lead wire 380 and it is seen that the solenoid 270 is connected between lead 380 and power conductor 348. The junction 382 is connected with power conductor 350 through cam operated switch 177.

The electromagnetic brake and clutch designated by reference numeral 28 in FIGURE 6 includes a brake energizing coil winding 28a and a clutch energizing coil winding 28b. When the brake coil winding 28a is energized the shaft 30 is caused to be braked to stop its rotation and there is no drive between the shafts 26 and 30. When the clutch coil 28b is energized, the power is transferred between the pulley 26 and the shaft 30 and no braking occurs. The brake coil 28a and the clutch coil 28b are fed from a bridge rectifier circuit designated by reference numeral 384 having input terminals connected with power conductors 348 and 350 and having output terminals connected with lead wires 386 and 388. The lead wires 386 and 388 carry direct current and it is seen that lead wire 386 is connected with switch contactors 390 and 392. The contactor 390 cooperates with fixed contact 394 whereas the movable contactor 392 cooperates with fixed contactor 396. The movable contactors 390 and 392 are operated by a relay coil 398. When relay coil 398 is deenergized the contactor 390 engages contact 394 and contactor 392 is out of engagement with fixed contact 396. On the other hand, when relay coil 398 is energized the contactor 390 leaves fixed contact 394 and the contactor 392 moves into engagement with fixed contact 396. It is seen that the contactor 390 controls the energization of the brake coil 28a whereas the contactor 392 controls the energization of the clutch coil 28b.

The relay coil winding 398 is connected across the power conductors 348 and 350 through cam operated switches 178 and 33a and through switches 400 and 402. The switches 400 and 402 are normally in an open position but will be moved to a closed position whenever the stakers move to their up position. Two switches are required because of the two staking mechanisms.

In operation, when the operator of the combined armature winder and staker desires to apply a coil winding to an armature assembly and stake the leads to the commutator the armature assembly including a shaft, laminations and commutator is placed in the machine. The switches 336, 338 and 340 are closed and the switch 352 is closed to cause an energization of motors 22 and 166. When this is done the operator of the machine closes the manually operable switch 354 to cause an energization of coil solenoid 272 and to thus cause the tail stock to be brought forward to move the armature assembly into the position illustrated in FIGURES 21 through 23. In this position, one end of the shaft is forced into the collet mechanism and the commutator abuts the sleeve designated by reference numeral 92. When the tail stock moves in, the switch 360 is caused to be closed thus completing a circuit for solenoids 276 and 282 which respectively cause the collet to be closed and the armature to be stamped. When the collet closes, the switch 118 is caused to be closed thus completing a circuit for solenoid 288 and actuation of the locating pin.

When these operations have been performed, the operator threads a portion of wire to the machine. This portion of wire is fed over the portions 84 and 85 of the looping horns. The operator then causes the manually operable switch 366 to be closed and it is seen that the closure of this switch causes an energization of solenoid 294. The energization of solenoid 294 will cause the gripping sleeve 69 to be moved forward thus causing a small loop of wire to be clamped between the gripping sleeve 69 and the projecting horn portions 84 and 85 of the looping horn. After this is accomplished the one-turn clutch is energized to cause certain of the cam controllers to be moved forward. During this movement of the cam controllers, the cam operated switch 196 is caused to contact the fixed contact 196b to complete a circuit to solenoids 306 and 312. With solenoids 306 and 312 energized, the stakers will be moved up and during this upward movement the staking blades 230 and 232 will be moved inwardly to drive a section of wire into commutator slots A and B illustrated in FIGURE 24. It will be appreciated that when the stakers 232 and 230 move inwardly they not only drive the wire from between the gripping sleeve and looping horn, but also shear the wire off and fracture the insulation on the wire so that two ends of the wire are now positioned within commutator slots A and B.

Figures 19, 20:
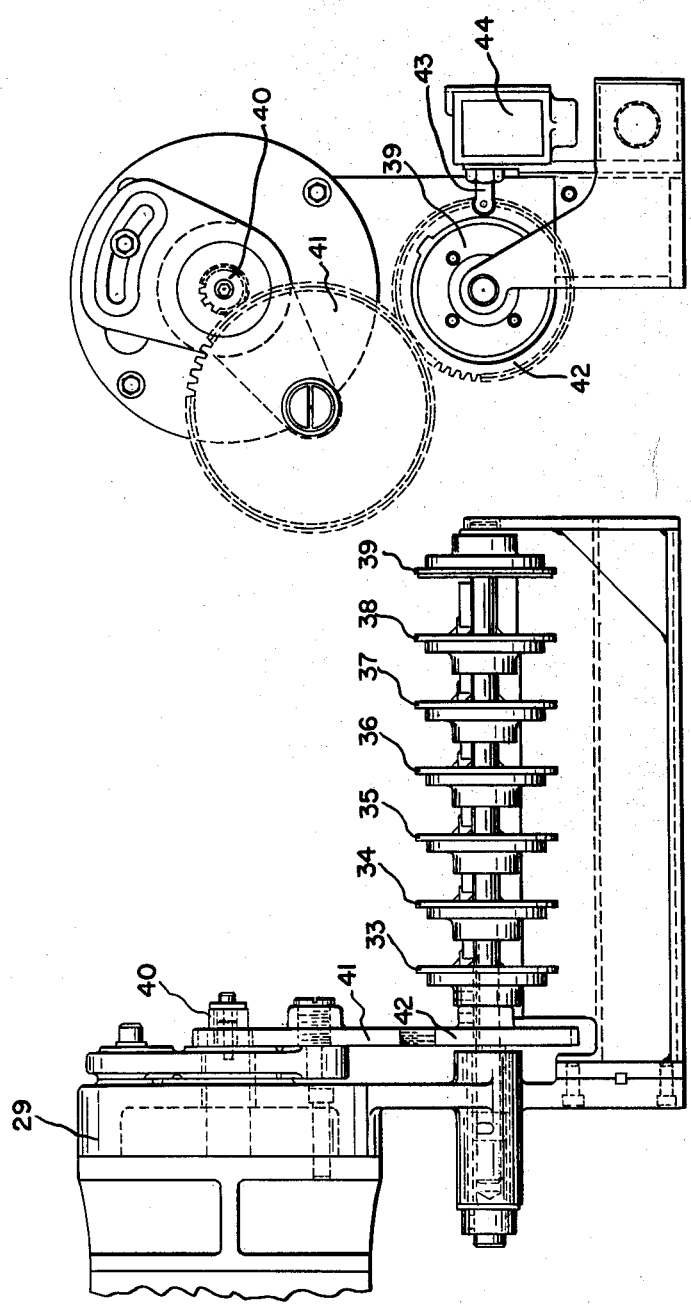
FIGURE 19 is a side view of one of the cam controllers that forms a part of the armature winder and staker of this invention.
FIGURE 20 is an end view of the cam controller illustrated in FIGURE 19.

When the stakers move to their up position, the switches 400 and 402 are caused to be closed. The cam operated switch 174 is now closed so that a circuit is completed for relay coil 398 which causes the brake solenoid 28a to be deenergized and the clutch solenoid 28b to be energized. The electromagnetic brake and clutch will thus cause the flyer arms 47 and 48 to rotate to apply wire to the armature core. This point in the operation of the armature winder and staker is depicted in FIGURE 22 where it is seen that the leads are staked into the commutator 20 and the flyer arms with their pulleys 64 and 65 are beginning to rotate to apply turns of wire to slots D and E at one side of the armature and slots G and F at the opposite side of the armature core. The position of these slots in the armature with respect to the winding heads is better depicted in FIGURE 24. The number of turns of wire applied to opposite sides of the armature depends upon the configuration and rotation of cams 33 and 174. This is true because the cam 174 causes the switch 178 to be opened. During the time that wire is being applied to the armature core, the cams connected with the electromagnetic brake and clutch are rotating. These cams are illustrated in FIGURES 19 and 20 of the drawings.

Before the flyer arms stop winding or applying turns of wire to the armature core the cam 35 causes the switch 35a to be closed thus completing a circuit for the one-turn clutch solenoid 154. With solenoid 154 closed the cams illustrated in FIGURES 17 and 18 begin to be driven. The cam operated switch 178 is caused to be opened a short time after the cams illustrated in FIGURES 17 and 18 begin to turn. The cam operated switch 33a then opens and it can be seen that with both switches 178 and 33a opened the solenoid or relay coil 398 will be de-energized. With relay coil 398 deenergized the clutch coil 28b is deenergized and the brake coil 28a becomes energized. This will cause the drive between the motor and the flyer arms to be disconnected and will stop the flyer arms at a predetermined position. It thus can be seen that the shape and rotation of cam 33 will dictate the number of turns of wire applied to opposite slots of the armature core. By changing this cam and certain other cams of the armature winder and staker it is possible to predetermine the number of turns of wire that will be applied to opposite slots of the armature during rotation of the flyer arms. It thus is seen that by changing these cams the armature winder and staker become very versatile in operation in that any number of turns of wire may be applied to the armature core.

It should be noted that before the flyer arms stop their rotation the looping horn member 80 is projected forward by fluid motor 90 under control of valve 292 so that the projecting members 84 and 85 are in the path of the last turn of wire and the wire will wind itself in a semicircle onto the projecting horn portions 84 and 85. It is to be understood that the looping horn 80 is moved forwardly just before the last turn of wire is coming over the winding heads 57 and 56. The position of the looping horn 80 just prior to the wire being passed over them is illustrated in FIGURE 23 of the drawings. The position of the parts after the wire has passed over the projecting horn portions 84 and 85 of the looping horns is illustrated in FIGURE 21, and in this position the flyer arms have stopped their movement and a short coil of wire engages opposite edges of the horn portions 84 and 85 of the looping horn. It will be appreciated that the stopping of the flyer was controlled by the cams that are driven by the electromagnetic brake and clutch 28 whereas the movement of the looping horn 80 was caused by the cam controller 37.

It will be appreciated that when the flyer arms have stopped and have looped portions of wire over projecting portions 84 and 85 of the looping arm, the cams 99 and 102 are being driven through the one-turn clutch 150 and that the cams illustrated in FIGURES 17 and 18 that control various electrical switches are also being driven. This portion of the cycle may be termed the "staking portion" as the flyer arms are now stationary and the control of the machine is from the motor 166 which is driving the various cam operated switches shown in FIGURES 17 and 18 and the cams 99 and 102.

With shaft 101 rotating and with the wire looped over the ends or projecting horn portions 84 and 85 of the looping horn, the gripping sleeve 69 is caused to be projected forward by the cam 79 which is driven from shaft 101 through the one-turn clutch 150. This gripping sleeve will be projected forwardly mechanically through the arm 76 and bell crank lever 73 illustrated in FIGURES 11 and 12. As the gripping sleeve 69 moves forwardly, it will grip the wire between it and the projecting portions 84 and 85 of the looping horn. The wire will thus be pinched between the projecting horn portions 84 and 85 of the looping horn and the sleeve and will be located in alignment with a pair of commutator slots.

Figure 26:
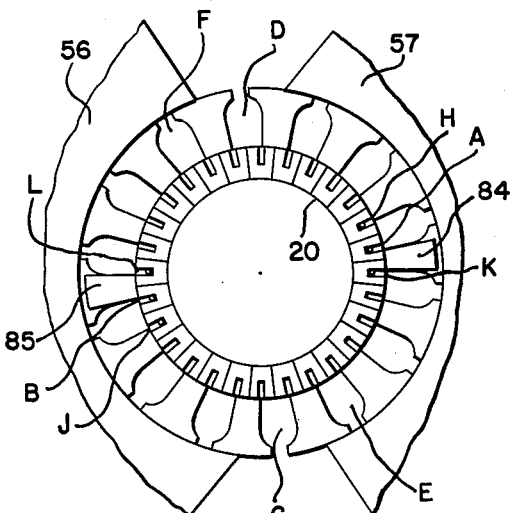

With the shaft 101 still rotating, the cams 99 and 102 are driven to cause indexing of the looping horn and the sleeve gripper and to cause also indexing of the commutator 16. Thus with the wire gripped between the looping horn sleeve and the looping horn the projecting horn portions 84 and 85 are indexed from the FIGURE 24 position to the FIGURE 25 position. The commutator 16 is likewise indexed from the FIGURE 24 position to the FIGURE 25 position. With the commutator and the looping horn in the position illustrated in FIGURE 25 and with the stakers in an up position, the switch 198 is caused to be closed by the cam 188 to cause an energization of solenoids 308 and 314. This causes the staker to move downwardly, thus causing the staking blades to sever a part of the loop wrapped around the portions 84 and 85 and to drive these severed ends into commutator slots H and J. This will form the end connection for the first coil winding that has been applied to the armature core, this coil winding starting in commutator slots A and B and ending in commutator slots J and H. The cams 99 and 102 which continue to be driven by shaft 101 now cause the commutator and the sleeve gripper and looping horn to be indexed to the FIGURE 26 position. These ends of the wires will be driven into the slots K and L by an upward movement of the stakers which previously moved down to drive the lead wires into slots H and J. This upward movement of the stakers is caused by the closure of switch 196 which completes a circuit through the contact 196b to the solenoids 306 and 312. During the upward movement of the staker, the staking blades are moved inwardly to drive the lead wires from between the looping horn and gripping sleeve into the commutator slots K and L. As in the previous staking operation, the wire is simultaneously severed as it is driven from between the looping horn and gripping sleeve.

Figure 27:
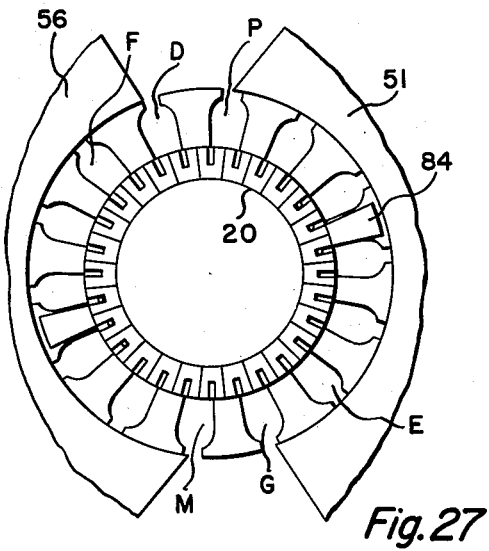

When the wire has been driven into slots K and L there is no longer any wire left between the looping horn and gripping sleeve except for a short arcuate portion. The shaft 101 continues to rotate and the looping horn and the gripping sleeve will now be moved back to the position illustrated in FIGURE 22. The cam 190 will now cause the switch 200 to be closed to complete a circuit for the armature indexing solenoid 324. With solenoid 324 energized, the fluid motor 136 will be caused to move to cause an indexing of the armature to the FIGURE 27 position. In the FIGURE 27 position, conductors will be applied to armature slots D and M, and G and P. These conductors will be applied to these slots in the same manner as those applied to slots F and G, and D and E in FIGURE 24, that is the flyer arms are caused to once more to rotate through the electromagnetic brake and clutch to apply a predetermined number of turns of wire to the slots D and M, and P and G. It will be appreciated that during the application of this wire to the slots D and M, and P and G the end of the conductors are staked in commutator slots K and L. This winding operation is once more depicted in FIGURE 22 of the drawings where the pulleys 64 and 65 are rotating with the flyer arms and where the wires are staked into the commutator 16.

After a predetermined number of turns is applied to slots D and M, and P and G, the flyer arms are once more stopped just subsequent to the looping horn being moved forwardly so that the projecting portions 84 and 85 are moved into the path of the wire being applied to the armature core by the flyer arms. This is the same as in previous staking operations described hereinbefore. After the lead wires are wrapped around the projecting portions 84 and 85, the looping horn sleeve is then brought forward to grip the wire between the sleeve and the projecting portions 84 and 85, as has been previously described. The looping horn, when it is brought forward into the path of the wire being applied to the armature, is again illustrated in FIGURE 23 of the drawings.

Figure 28:
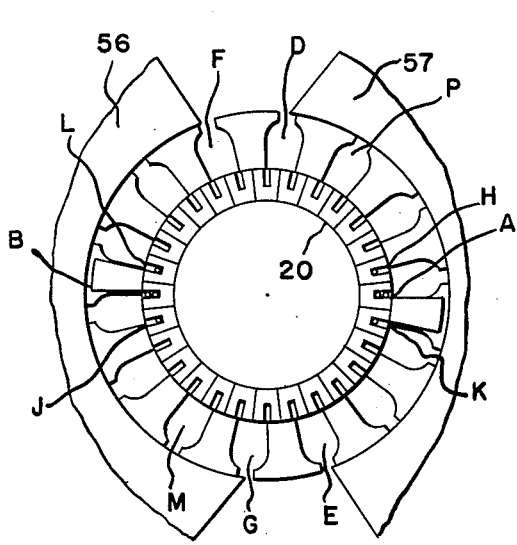

Once the wire has been again pinched between the gripping sleeve and the projecting portions 84 and 85 of the looping horn, the commutator and looping horn and gripping sleeve are indexed to the FIGURE 28 position. It is seen from FIGURE 28 that the commutator slots A and B, which previously have had a wire driven into them, are now presented to the stakers for having a second wire driven into them. The stakers are now moved downwardly to drive the second wire into commutator slots A and B over the first wire that was driven into these slots. In connection with this, it should be pointed out that the depth that the wire is driven into these slots is controlled by the eccentric pin designated by reference numeral 246 in FIGURE 14 and the positioning of this pin is, in turn, controlled by the fluid motor 252. The actuation of the fluid motor 252 is, in turn, controlled by the coil winding 318 and the energization of this coil winding is controlled by cam operated switches 216 and 192a. In addition, the energization of solenoid 318 is controlled by cam operated switch 214 and relay coil 372. This eccentric is thus controlled at the right moment in the cycle of operation to provide for either driving the conductors entirely into the bottom of the slot of the commutator or is controlled to shorten the throw of the stakers 230 and 232 to drive the conductor only part way into the slot, which is the case in FIGURE 28. The eccentric 246 will then operate to shorten the stroke of the stakers 230 and 232 when the second conductor is being applied to a commutator slot, which is the case in FIGURE 28 of the drawings.

Figure 29:
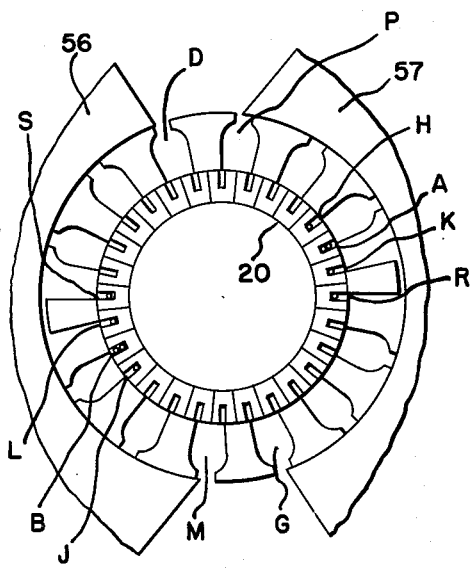

After the second conductor has been applied to commutator slots A and B, the commutator and the looping horn and gripping sleeve are indexed to the FIGURE 29 position. In the FIGURE 29 position, the commutator slots R and S are presented to the staking blades and as the staker now moves upwardly the conductors are driven from the gripping sleeve and looping horn into the slots R and S. The looping horn and gripping sleeve now move rearwardly and with the conductors driven into the R and S commutator slots another coil winding may be applied to the slots of the armature. The conductors driven into slots A and B form the ends of the second coil windings applied to the armature core while the conductors driven into commutator slots R and S form the beginning of the third coil winding that will be applied to the armature core. The machine now goes through another winding operation wherein the flyer arms are rotated to apply conductors to a pair of armature slots and then goes through another staking operation and continues the winding and staking operation until all the coil windings have been applied to the armature core and all of the conductors have been driven into the commutator slots. When this has been accomplished, the cam operated switch 177 will close to cause the tail stock to be returned to its back position and when the tail sock is returned to its back position the switch 376 will be closed to cause an energization of solenoid 278 and an opening of the collet. The armature assembly is now completely wound with coil windings and the commutator is completely staked. The wound and staked armature assembly may then be moved to another station where the wires embedded in the commutator are soldered or otherwise secured thereto.

Figure 24:
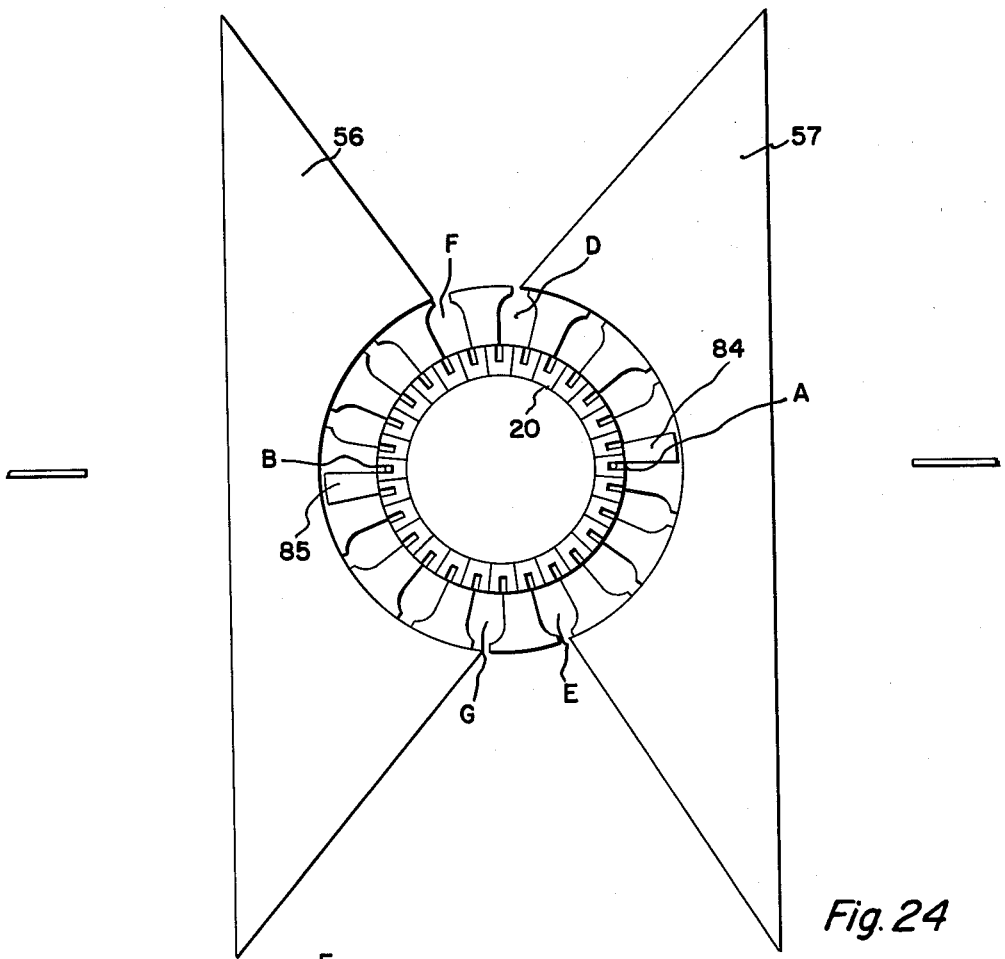
FIGURES 24 through 29 illustrate various positions of the commutator during the winding and staking operation.
Figure 25:
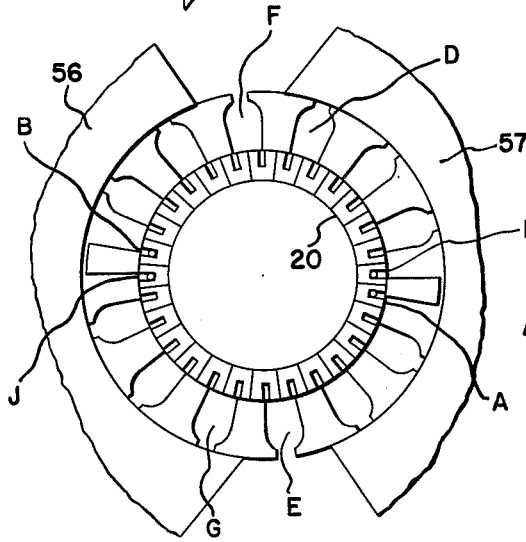

In summarizing the operation of this armature winder and staker, it will be apparent from the foregoing description that a pair of conductors are first staked to opposite commutator slots as is illustrated in FIGURE 24 of the drawings. The armature is then held stationary while the flyer arms apply coils of wire to opposite slots of the armature core, the wire being directed into the slots by the winding heads 57 and 56. When the flyer arms are just ready to stop, a looping horn is projected forwardly and the flyer arms carry the wire around the projecting portions 84 and 85 of the looping horn. The sleeve gripper is then moved forwardly to tightly grip the wire and to hold the wire in alignment with a pair of commutator slots. The stakers then drive the wires into the commutator slots, the commutator and looping horn together with the gripping sleeve being indexed at the proper time in order that wires may be applied to adjacent commutator slots. After the stakers have performed their operation, two of the conductors are staked into opposite commutator slots and the flyers may then once more operate to apply coil windings to oppositely disposed armature core slots. This alternate winding and staking of the armature assembly is a continuous operation and continues as long as there are slots to fill and some commutator slots to be staked.

It should be pointed out that the flyer arms are driven by the motor 22 through the electromagnetic brake and clutch 28. This motor also drives the cam controllers illustrated in FIGURES 19 and 20. The staking operation on the other hand is controlled by the motor 166 which drives the shaft 101 through the clutch 150. It will be appreciated that during the staking operation the rotation of the looping horn and gripping sleeve and the rotation of the commutator is controlled by cams 99 and 103, whereas the back and forth movement of the gripping sleeve is controlled by the cam 79. The moving forward and rearward of the looping horn is controlled by fluid motor 90, as has been clearly set forth hereinbefore. The operation of the staking blades is controlled by the cam controllers that are driven by the shaft 101. It thus is seen that there are two separate drive systems, one for the staking operation and one for the winding operation but that these two separate drive systems are interconnected to provide a continuous winding and staking operation for the armature assembly.

While the embodiments of the invention as herein disclosed constitute preferred forms, it is to be understood that other forms might be adopted.

What is claimed is as follows:

1. In a method of winding an armature core and staking lead wires to a commutator, the steps comprising, supporting an armature assembly including an armature core and a commutator, positioning a pair of wires in alignment with first opposite commutator slots, driving said wires into first commutator slots, applying coil windings to said armature core beginning with the wires driven into said first commutator slots while maintaining said armature assembly stationary, forming a loop of wire at the end of each coil winding and positioning a portion of said loop of wire in alignment with second opposite commutator slots and then driving a section of each loop of wire into said second commutator slots.

2. In a continuous method of applying coil windings to an armature core and staking lead wires to a commutator, the steps comprising, supporting an armature assembly including an armature core and a commutator, holding a wire in alignment with a first commutator slot by holding means, driving said wire from said holding means into said first commutator slot, directing said wire into a pair of armature core slots by applying the wires along paths that are substantially parallel with the longitudinal axis of said armature assembly while maintaining the armature assembly stationary, forming a loop in said wire, holding a part of said loops in alignment with a second commutator slot by said holding means, and driving said part into said second commutator slot from said holding means, one of the wires driven into one of said commutator slots being the beginning of a first coil winding and the other wire driven into another commutator slot being the end of said first coil winding.

3. In a continuous method of applying coil windings to an armature core and staking lead wires to a commutator, the steps comprising, supporting an armature assembly including an armature core and a commutator, holding a pair of wires in alignment with first oppositely disposed commutator slots by holding means, driving said wires from said holding means into said first commutator slots, directing said pairs of wires over one end of the armature core through a pair of armature slots then across the opposite end of the armature core and thence through other armature slots to apply coil windings to said armature core while maintaining said armature assembly stationary, forming a loop in each of said wires, holding parts of said loops in alignment with pairs of second commutator slots by said holding means, and then driving said parts into said second commutator slots from said holding means.

4. In a continuous method of applying coil windings to an armature core and staking lead wires to a commutator, the steps comprising, supporting an armature assembly including an armature core and a commutator, holding a pair of wires in alignment with first oppositely disposed commutator slots by holding means, driving said wires from said holding means into said first commutator slots, directing said wires into pairs of oppositely disposed armature core slots by applying the wire along a path that is substantially parallel with the longitudinal axis of said armature assembly while maintaining the armature assembly stationary, forming a loop in each of said wires by passing a part of said wires over horn members, holding said wire parts against said horn members in alignment with pairs of second oppositely disposed commutator slots, and driving said wire parts into said second commutator slots from said horn members.

5. In a continuous method of applying coil windings to an armature core and staking lead wires to a commutator, the steps comprising, supporting an armature assembly including an armature core and a commutator, holding a wire in alignment with a first commutator slot by holding means, driving said wire from said holding means into said first commutator slot, directing said wire into a pair of armature core slots by applying the wire along a continuous path that is substantially parallel with the longitudinal axis of said armature assembly while maintaining the armature assembly stationary, staking two lengths of said wire in two other commutator slots, one of the wires driven into one of said other commutator slots being the end of a first coil winding and the other wire driven into the other of said commutator slots being the beginning of a second coil winding, and then directing said wire into pairs of oppositely disposed armature core slots by applying the wire along a continuous path that is substantially parallel with the longitudinal axis of said armature assembly while maintaining the armature assembly stationary, and then continuing the aforesaid staking operation and winding operations to completely wind and stake an armature assembly.

6. In a continuous method of applying coil windings to an armature core and staking lead wires to a commutator, the steps comprising, supporting an armature assembly including an armature core and a commutator, staking a lead wire into one of the commutator slots, directing said wire into pairs of oppositely disposed armature core slots by applying the wire along a continuous path that is substantially parallel with the longitudinal axis of said armature assembly while maintaining the armature assembly stationary, severing a length of said wire and staking the severed ends of said wire into pairs of commutator slots whereby the staked end of one of said lengths of wire forms the end of a first coil winding and the severed end of the other wire forms the beginning of another coil winding, and then alternately winding and staking as aforesaid to completely wind and stake an armature assembly.

7. An armature winding and staking machine comprising, means for supporting an armature assembly that includes an armature core and a commutator, a pair of arm members positioned at opposite sides of said armature assembly and movable in a circular path, means for driving said arm members, a pair of horn members, said horn members being movable into the path of wire applied to said armature assembly by said arm members, a gripping member adapted to move to a position adjacent said horn members and to a position where said wire is held between said horn members and said gripping member, and means for driving said horn member and said gripping member.

8. An armature winder and staker comprising, a support, a pair of winding heads carried by said support having complementary recesses adapted to receive an armature assembly that includes an armature core and a commutator, a pair of arm members journalled for rotation around said winding heads, a horn member, means for moving said horn member into said winding heads and for retracting the same from said winding heads, a gripping sleeve, means for moving said gripping sleeve relative to said horn member, said horn member and gripping sleeve being adapted to grip a wire therebetween in alignment with a commutator slot of said commutator, and staking means adapted to drive said wire from between said horn member and gripping sleeve into said commutator slot.

9. An armature winder and staker comprising, a pair of winding heads having complementary arcuate recesses that are adapted to receive an armature assembly that includes an armature core and a commutator, a pair of arm members journalled for rotation around said winding heads, said arm members being adapted to direct wire onto said winding heads for slidable movement into armature core slots, a looping horn member having a pair of projecting portions, means for moving said looping horn member into said winding heads whereby said wire is wound around said projecting portions when said arms move through a predetermined arc, a gripping sleeve adapted to move to a position adjacent the projecting portions of said looping horn member for gripping said wire between said projection portions and said gripping sleeve, means for moving said gripping sleeve, means for driving said arm members, a pair of staking blades adapted to drive the wire from its gripped position between said projecting portions of said looping horn and said gripping sleeve into a pair of commutator slots, and means for driving said staking blades.

10. An armature winding and staking machine comprising, means for supporting an armature assembly including a slotted armature core and a slotted commutator, means rotatable in a circular path for applying coil windings of wire to oppositely disposed armature core slots, looping horn means movable into the path of the wire being applied to said armature core slots for forming a loop of wire when said wire is wound around said looping horn means, gripping means adapted to move adjacent said looping horn means for holding said wire in a gripped position between said looping horn means and said gripping means, and staking means for simultaneously driving said wire from between said gripping means and said looping horn means into said commutator slot and for severing said wire.

11. An armature winding and staking machine comprising, means for supporting an armature assembly including a slotted armature core and a slotted commutator, arm means for applying coils of wire to oppositely disposed armature core slots rotatable in a circular path in a plane generally parallel to the longitudinal axis of said armature assembly, a horn means, said horn means being movable into the path of wire being applied to said armature core by said arm means and adapted to form a loop of wire as said arm means applies wire to said horn means, gripping means movable to a position adjacent said horn means for gripping wire between said horn means and gripping means, and staking means for driving said wire from between said horn means and said gripping means into a commutator slot and for substantially simultaneously severing said wire.

12. An armature winding and staking machine comprising, support means for supporting an armature assembly including an armature core and a commutator, means for applying coils of wire to the slots of said armature core, means for gripping a length of said wire, staking means for driving said wire from said gripping means into a commutator slot, means for varying the throw of said staking means and means for synchronizing the operation of said means for applying coils of wire with the operation of said means for gripping said wire and said staking means.

13. An armature winding and staking machine comprising, support means for supporting an armature assembly that includes a slotted armature core and a slotted commutator, means for forming coils of wire in the slots of said slotted armature core movable in a circular path that is in a plane substantially parallel to the longitudinal axis of said armature assembly, means for forming a loop of wire and for holding said wire in alignment with a commutator slot, staking means for driving said wire from said last named means into a commutator slot, means for varying the throw of said staking means and means for synchronizing the operation of said means for forming coils of wire, said means for forming a loop of wire and said staking means.

14. A combined armature winder and staking machine comprising, a pair of winding heads having complementary arcuate recesses that are adapted to receive an armature core of an armature assembly that includes a slotted armature core and a slotted commutator, a pair of arm members journalled for rotation around said winding heads and each having means for carrying a length of wire to be wound on said slotted armature core, said winding heads having inclined surfaces forming skids for a wire applied to said winding heads by said rotatable arm members, a sleeve member adapted to embrace said commutator having a pair of slots located at opposite sides thereof, said slots being disposed on opposite sides of a pair of projecting horn members, a gripping member having oppositely disposed slots that are adapted to move adjacent the projecting horn portions of said sleeve member, said slots being sized to form a space with said horn members means for moving said sleeve member and said gripping member relative to each other, said sleeve member being adapted to be moved within said winding heads whereby said arm members apply wire to said projecting horn members when they move through a predetermined arc of their path of movement, said gripping member being adapted to grip said wire in said space between said sleeve member and said gripping member, and staking means for driving wire gripped between said gripping member and said sleeve member into commutator slots.

15. An armature winding and staking machine, comprising, a pair of winding heads each having an arcuate recess which is adapted to receive an armature assembly that includes a slotted armature core and a slotted commutator, said winding heads having inclined surfaces for directing wire into slots of said armature core, a pair of arm members journalled for rotation around said winding heads, a looping horn member, a gripping sleeve, means supporting said looping horn member for slidable movement relative to said gripping sleeve and for movement into said winding head, first control means for controlling the operation of said rotatable arms, second control means for controlling the operation of said looping horn and gripping sleeve, and means for synchronizing the operation of said first and second control means.

16. An armature winding and staking machine comprising, a pair of winding heads having complementary recesses that define an opening that is adapted to receive an armature assembly that includes a slotted armature core and a slotted commutator, a pair of flyer arms mounted for rotation around said winding heads, a looping horn member supported for slidable movement into and out of said winding head, a gripping sleeve mounted for slidable movement relative to said looping horn member and adapted to move over portions of said looping horn member, means on said flyer arms for applying wire to said winding heads during rotation of said arms, means for moving said looping horn member in said winding heads as said arms are rotating in one direction, means for stopping movement of said flyer arms after said flyer arms have applied wire to said looping horn member, means for causing said gripping sleeve to move adjacent said looping horn member to grip the wire between said looping horn member and gripping sleeve, staking means for driving said wire from its gripped position between said looping horn member and gripping sleeve and into a commutator slot and means for synchronizing the operation of said flyer arms, looping horn member, gripping sleeve, and staking means.

17. A combined armature winder and staker comprising, a pair of winding heads having complementary recesses adapted to receive an armature assembly that includes a slotted armature core and a slotted commutator, a pair of winding arms journalled for rotation around said winding heads and including means for carrying wire that is adapted to be applied said armature core slots, control means for controlling the operation of said winding arms, means including said winding arms for forming loops of wire when said winding arms pass through a predetermined arc, means for gripping said wire to hold portions thereof in alignment with a commutator slot, staking means for driving said wire from said gripping means into a commutator slot and means for synchronizing the operation of said winding arms, said means for forming loops of wire, said gripping means and said staking means.

18. An armature winder and staker comprising, a pair of winding heads having complementary recesses that are adapted to receive an armature assembly that includes a slotted armature core and a slotted commutator, a pair of winding arms positioned closely adjacent said winding heads and adapted to rotate around said winding heads, said winding arms including means for carrying wire and for applying said wire to inclined surfaces of said winding heads, a looping horn supported for slidable and rotatable movement and adapted to be slid into said winding heads, a gripping sleeve supported for slidable movement relative to said looping horn and connected for rotatable movement with said looping horn, means for controlling the operation of said winding arms, means for indexing said armature assembly to present different core and commutator slots, means for controlling the slidable and rotatable movement of said looping horn and gripping sleeve, staking means for driving wire from between said looping horn and gripping sleeve into commutator slots and means for synchronizing the operation of said winding arms, looping horn, gripping sleeve, and staking means.

19. An armature winder and staker comprising, support means for supporting an armature assembly that includes a slotted armature core and a slotted commutator, a winding arm movable in a circular path, said winding arm having means for applying wire to said slotted armature core, means including said winding arm for forming a loop of wire when said winding arm is rotated in one direction through a predetermined arc, means for gripping said loop of wire, means for driving at least a portion of said gripped loop of wire into a commutator slot and means for synchronizing the operation of said winding arm, said means for forming a loop of wire, said means for gripping said loop of wire and said means for driving said wire into a commutator slot.

20. An armature winding and staking machine comprising, support means for supporting an armature assembly that includes a slotted armature core and a slotted commutator, a winding arm rotatable in a circular path for applying turns of wire to opposed slots of said armature core, said winding arm including means for carrying said wire, means including said winding arm for forming a loop of wire when said winding arm moves in one direction in a predetermined arc, means for gripping said loop of wire, means for severing said loop of wire and for driving the severed end into a commutator slot and means for synchronizing the operation of said winding arm, said means for forming a loop of wire, said means for gripping said loop of wire and said means for severing said loop of wire and for driving it into a commutator slot.

21. An armature winder and staker comprising, support means for supporting an armature assembly that includes a slotted armature core and a slotted commutator, a winding arm rotatable in a circular path and including means for applying wire to opposite slots of said armature core, means including said winding arm for forming a loop of wire in alignment with a commutator slot when said winding arm is rotated through a predetermined arc in one direction, gripping means for gripping said loop of wire, staking means for driving a portion of said loop of wire into a commutator slot, and means for synchronizing the operation of said winding arm, said gripping means and said staking means.

22. The armature winding and staking machine according to claim 12 where the staking means includes a scissors-type linkage and wherein the means for varying the throw of the staking means includes a shiftable eccentric.

23. The armature winding and staking machine according to claim 12 where the means for varying the throw of the staking means includes an eccentric pin connected with a pair of link members and a fluid motor for rotating the pin.

References Cited in the file of this patent

UNITED STATES PATENTS

| | | |
|---|---|---|
| Re. 17,800 | Baker | Sept. 16, 1930 |
| 2,243,006 | Houston | May 20, 1941 |
| 2,432,267 | Adamson | Dec. 9, 1947 |
| 2,455,355 | Combs | Dec. 7, 1948 |
| 2,542,538 | Kraeft et al. | Feb. 20, 1951 |
| 2,703,923 | Caldwell | Mar. 15, 1955 |
| 2,743,508 | Isaacson | May 1, 1956 |
| 2,816,276 | Fuller et al. | Dec. 10, 1957 |
| 2,859,511 | Gallagher et al. | Nov. 11, 1958 |
| 2,904,269 | Eminger | Sept. 15, 1959 |
| 2,988,291 | Greene et al. | June 13, 1961 |